US010819679B2

(12) United States Patent
Peng

(10) Patent No.: US 10,819,679 B2
(45) Date of Patent: Oct. 27, 2020

(54) ZERO TOUCH PROVISIONING OF A NETWORK ELEMENT THROUGH A NETWORK ADDRESS TRANSLATION GATEWAY

(71) Applicant: Ciena Corporation, Hanover, MD (US)

(72) Inventor: Cheng Peng, Nepean (CA)

(73) Assignee: Ciena Corporation, Hanover, MD (US)

(*) Notice: Subject to any disclaimer, the term of this patent is extended or adjusted under 35 U.S.C. 154(b) by 198 days.

(21) Appl. No.: 15/968,864

(22) Filed: May 2, 2018

(65) Prior Publication Data
US 2019/0342262 A1 Nov. 7, 2019

(51) Int. Cl.
*H04L 29/12* (2006.01)
(52) U.S. Cl.
CPC ........ *H04L 61/256* (2013.01); *H04L 61/2076* (2013.01); *H04L 61/2571* (2013.01)
(58) Field of Classification Search
CPC .............. H04L 61/256; H04L 61/2076; H04L 61/2571; H04L 61/2015; H04L 61/2061; H04L 12/4633; H04L 12/4641; H04L 2012/4629; H04L 12/2801; H04L 12/287; H04L 29/12028; H04L 29/1282; H04L 43/028; H04L 45/00
See application file for complete search history.

(56) References Cited

U.S. PATENT DOCUMENTS

| 7,337,224 B1* | 2/2008 | Van Horne, III | H04L 29/12283 709/223 |
| 7,420,933 B2 | 9/2008 | Booth, III et al. | |
| 8,260,902 B1* | 9/2012 | DeGraaf | H04L 63/0272 709/220 |
| 10,177,977 B1* | 1/2019 | Avramov | G06F 8/61 |
| 2004/0073600 A1* | 4/2004 | Elo | H04L 63/1408 709/201 |
| 2005/0050161 A1* | 3/2005 | Arnold | H04L 61/2015 709/217 |
| 2005/0163118 A1* | 7/2005 | Steindl | H04L 29/12254 370/389 |

(Continued)

FOREIGN PATENT DOCUMENTS

WO 2016/159954 A1 10/2016

OTHER PUBLICATIONS

Stapp "Request for Comments 4243" (RFC 4243) (Stapp), IETF, Dec. 2005. (Year: 2005).*

(Continued)

*Primary Examiner* — Ninos Donabed
(74) *Attorney, Agent, or Firm* — Clements Bernard Walker; Lawrence A. Baratta, Jr.; Christopher L. Bernard

(57) ABSTRACT

Systems and methods for low or zero touch provisioning of a network element through a Network Address Translation (NAT) gateway are implemented via a Dynamic Host Configuration Protocol (DHCP) Relay Agent operating at the NAT gateway. The process includes receiving a DHCP packet with option 82 data from one of the network element and a DHCP server; modifying addressing and the option 82 data of the DHCP packet based on whether the receiving was from the network element or the DHCP server; and forwarding the modified DHCP packet to one of the network element and the DHCP server based on the receiving.

13 Claims, 15 Drawing Sheets

(56) References Cited

U.S. PATENT DOCUMENTS

| | | | |
|---|---|---|---|
| 2008/0025299 A1* | 1/2008 | Agarwal | H04L 61/6013 370/389 |
| 2010/0191813 A1* | 7/2010 | Gandhewar | H04L 61/2015 709/206 |
| 2010/0191839 A1* | 7/2010 | Gandhewar | H04L 61/2015 709/220 |
| 2010/0287266 A1 | 11/2010 | Asati et al. | |
| 2011/0040933 A1 | 2/2011 | Swindell | |
| 2011/0161510 A1* | 6/2011 | Arnold | H04L 12/2801 709/229 |
| 2012/0176896 A1* | 7/2012 | Denman | H04L 43/028 370/230.1 |
| 2013/0024553 A1* | 1/2013 | Mittal | H04L 41/0893 709/222 |
| 2013/0097335 A1* | 4/2013 | Jiang | H04L 61/2528 709/245 |
| 2014/0122674 A1 | 5/2014 | Gray et al. | |
| 2015/0263891 A1* | 9/2015 | Baugher | H04L 41/5041 370/254 |
| 2016/0164832 A1 | 6/2016 | Bellagamba et al. | |
| 2018/0287873 A1* | 10/2018 | Peng | H04L 41/0806 |
| 2019/0007368 A1* | 1/2019 | Hooda | H04L 63/0272 |

OTHER PUBLICATIONS

Shin "Gateway Discovery and Routing in Ad Hoc Networks with NAT-based Internet Connectivity" (Shin), IEEE 60th Vehicular Technology Conference (p. 2883-2886), 2004, IEEE. (Year: 2004).*

* cited by examiner

ZERO TOUCH PROVISIONING OF A NETWORK ELEMENT THROUGH A NETWORK ADDRESS TRANSLATION GATEWAY

FIELD OF THE DISCLOSURE

The present disclosure generally relates to networking systems and methods. More particularly, the present disclosure relates to low or zero touch provisioning systems and methods of network elements through a Network Address Translation (NAT) gateway.

BACKGROUND OF THE DISCLOSURE

Networks (e.g., optical, packet, etc.) are realized through physical network elements interconnected to one another. A network element is a collection of hardware and software configured to implement a node or device in the network. For example, network elements can be implemented via modules which fit into a chassis, a self-contained so-called pizza box, as well as multiple chassis physically connected to one another. Network elements are geographically deployed such as in Central Offices (COs), data centers, huts/shelters, customer premises, etc. The conventional approach to installation and provisioning includes field technicians installing, powering up the network element, and configuring provisioning information to enable the network element to communicate on the network. Zero Touch Provisioning (ZTP) includes automatic configuration of the network element once it is powered up and able to communicate on the network such as to automatically download provisioning information. Low Touch Provisioning (LTP), similar to zero touch provisioning, includes automatic configuration of the network element once the network element is at a minimum configuration for network communication. Advantageously, these approaches to provisioning significantly reduce turn up time and configuration errors.

One problem with ZTP or LTP is when the configuration server with the provisioning information for a network element is located in a different network (i.e., different address space). Network Address Translation (NAT) is a technique of mapping one Internet Protocol (IP) address space into another by modifying network address information in the IP header of packets. A NAT gateway is used to segment different private networks such as from the Internet. If the network element is located in a different network than the configuration server and an associated Dynamic Host Configuration Protocol (DHCP) server, DHCP requests from the network element are not able to reach the DHCP server and the configuration server.

There are generally three approaches to address this issue where a NAT gateway is located between the network element and the DHCP server/configuration server. First, the DHCP server can be moved within the private IP address space with the network element so that the DHCP packets do not need to pass through the NAT gateway. Second, a tunneling technique can be used such as Generic Routing Encapsulation (GRE), Virtual Private Network (VPN), etc. to tunnel DHCP packets between a DHCP relay agent and the DHCP server/configuration server. Third, all network elements in the private address space can be connected to the NAT gateway via the same network so a DHCP relay agent on the NAT gateway can serve the DHCP clients directly.

Of course, there are shortcomings with each of the approaches. First, network planners usually divide their network elements into several isolated groups in order to scale. Each group has one or more NAT gateway to communicate with northbound management systems. A network configuration of optical networks may choose to group all of the network elements in a specific site together and the network elements within a domain together. The network elements in a group communicate with the northbound management systems via the NAT gateways of its group. As a result, each group, by employing the first approach, must equip a DHCP server, which dramatically increases deployment cost as a network grows and also increases management complexity because the ZTP boot files that must be distributed to different DHCP servers.

The second approach avoids the shortcomings of the first approach because all DHCP boot files can be managed in a centralized DHCP server residing in the customers' data communication networks (DCN). However, in order to allow the DHCP packets to pass through the NAT gateway, a tunnel must be established between each DHCP relay agent and the DHCP server/configuration server. In zero touch provisioning contexts, it means that the tunnel must be provisioned on nearly every single network element because any remote network elements (RNEs) require a DHCP relay agent in order to complete ZTP. As a result, the tunneling approach not only increases the provisioning and management complexity but also raises the security concern.

The third approach requires a large layer 2 networks in the private IP address space. In large optical networks where the network elements are not geographically close, the third approach requires extensive planning and provisioning to bring all the network elements on the same layer 2 networks. In a typical optical system, the management traffic is carried over an Optical Service Channel (OSC), General Communication Channel (GCC) in Optical Transport Network (OTN), or Data Communication Channel (DCC) in SONET which do not have layer 2 functionality. Therefore, users have to equip extra layer 2 optical cards and carefully plan to avoid layer 2 traffic loops. Hence, the third approach is complex and costly.

BRIEF SUMMARY OF THE DISCLOSURE

In an embodiment, a method of low or zero touch provisioning of a network element through a Network Address Translation (NAT) gateway is implemented via a first Dynamic Host Configuration Protocol (DHCP) Relay Agent operating at the NAT gateway. The method includes receiving a DHCP packet with option 82 data from one of the network element and a DHCP server; modifying addressing and the option 82 data of the DHCP packet based on whether the receiving was from the network element or the DHCP server; and forwarding the modified DHCP packet to one of the network element and the DHCP server based on the receiving. The network element can be configured to obtain an Internet Protocol (IP) address from the DHCP server and through the NAT gateway and communicate to a configuration server to download a configuration automatically subsequent to configuration of the obtained IP address. The DHCP server can be in a different network address space from the network element.

The receiving from the network element and the forwarding to the network element can be performed with a second DHCP Relay Agent between the network element and the first DHCP Relay Agent. The second DHCP Relay Agent can be configured to send the DHCP packet to a destination address of the first DHCP Relay Agent, and the modifying on the first DHCP Relay Agent can include changing the destination address to an address of the DHCP server. The receiving can be from the network element and the forwarding is to the DHCP server, and wherein the modifying on the first DHCP Relay Agent can include changing a Gateway Internet Protocol (IP) Address (GIADDR) from an address of the second DHCP Relay Agent to an address of the NAT gateway; adding a Link Selection Sub-option as the address of the second DHCP Relay Agent; and changing a destination IP address from the first DHCP Relay Agent to the DHCP server. The receiving can be from the DHCP server and the forwarding is to the network element via the second DHCP Relay Agent, and wherein the modifying on the first DHCP Relay Agent can include changing a Gateway Internet Protocol (IP) Address (GIADDR) from an address of the NAT gateway to an address of the second DHCP Relay Agent; removing a Link Selection Sub-option as the address of the second DHCP Relay Agent; and changing a destination IP address from the NAT gateway to the second DHCP Relay Agent. The modifying the option 82 data on the second DHCP Relay Agent can include adding a signature in a Vendor-Specific Information Sub-option for authentication of returning packets.

In another embodiment, a Dynamic Host Configuration Protocol (DHCP) Relay Agent operates on a Network Address Translation (NAT) gateway for low or zero touch provisioning of a network element through the NAT gateway. The DHCP Relay Agent includes a processor; and memory storing instructions that, when executed, cause the processor to receive a DHCP packet with option 82 data from one of the network element and a DHCP server; modify addressing and the option 82 data of the DHCP packet based on whether the DHCP packet was received from the network element or the DHCP server; and forward the modified DHCP packet to one of the network element and the DHCP server based on where it was received. The network element can be configured to obtain an Internet Protocol (IP) address from the DHCP server and through the NAT gateway and communicate to a configuration server to download a configuration automatically subsequent to configuration of the obtained IP address. The DHCP server can be in a different network address space from the network element.

The DHCP packet can be received from the network element and forwarded to the network element with a second DHCP Relay Agent between the network element and the DHCP Relay Agent. The second DHCP Relay Agent can be configured to send the DHCP packet to a destination address of the DHCP Relay Agent, and the addressing can change the destination address to an address of the DHCP server. The DHCP packet can be received from the network element and forwarded to the DHCP server, and wherein the modification of addressing and the option 82 data can include a Gateway Internet Protocol (IP) Address (GIADDR) changed from an address of the second DHCP Relay Agent to an address of the NAT gateway; a Link Selection Sub-option added as the address of the second DHCP Relay Agent; and a destination IP address changed from the first DHCP Relay Agent to the DHCP server. The DHCP packet can be received from the DHCP server and forwarded to the network element via the second DHCP Relay Agent, and wherein the modification of addressing and the option 82 data can include a Gateway Internet Protocol (IP) Address (GIADDR) changed from an address of the NAT gateway to an address of the second DHCP Relay Agent; a Link Selection Sub-option removed as the address of the second DHCP Relay Agent; and a destination IP address changed from the NAT gateway to the second DHCP Relay Agent. The modification of the option 82 data can include a signature added in a Vendor-Specific Information Sub-option for authentication of returning packets.

In a further embodiment, a non-transitory computer-readable medium includes instructions for low or zero touch provisioning of a network element through a Network Address Translation (NAT) gateway, wherein the instructions are executed by a processor associated with a first Dynamic Host Configuration Protocol (DHCP) Relay Agent operating at the NAT gateway. The instructions are operable to cause the processor to perform the steps of receiving a DHCP packet with option 82 data from one of the network element and a DHCP server; modifying addressing and the option 82 data of the DHCP packet based on whether the receiving was from the network element or the DHCP server; and forwarding the modified DHCP packet to one of the network element and the DHCP server based on the receiving. The network element can be configured to obtain an Internet Protocol (IP) address from the DHCP server and through the NAT gateway and communicate to a configuration server to download a configuration automatically subsequent to configuration of the obtained IP address. The DHCP server can be in a different network address space from the network element. The receiving from the network element and the forwarding to the network element can be performed with a second DHCP Relay Agent between the network element and the first DHCP Relay Agent.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a network diagram of a network with network elements connected to a Data Communication Network (DCN) for provisioning information and the like;

DETAILED DESCRIPTION OF THE DISCLOSURE

Figure 1:
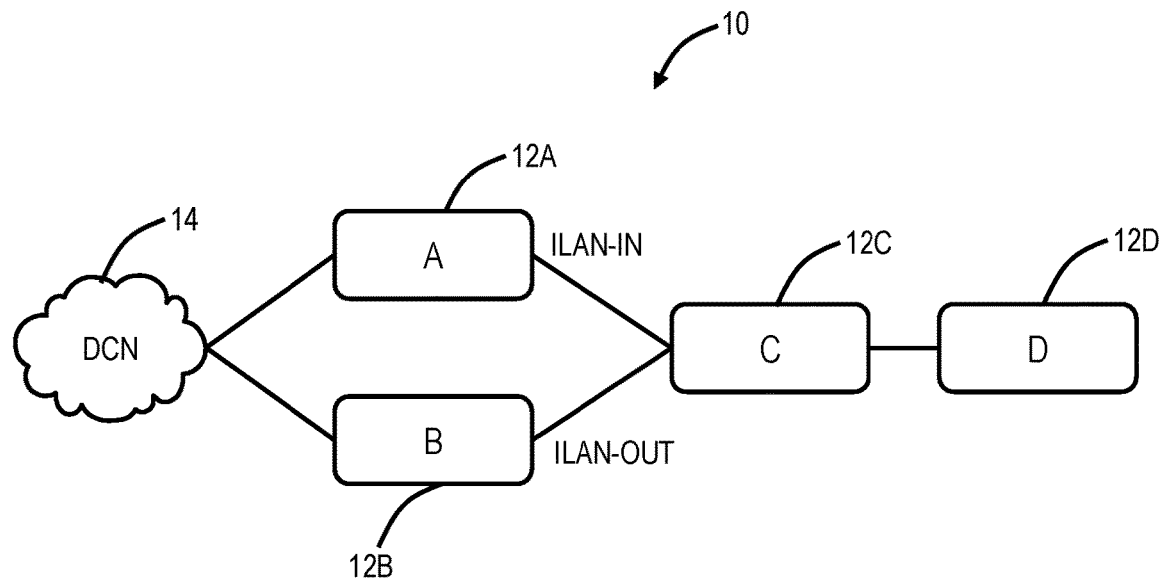
FIG. 1 is a network diagram of a network with network elements (NE)

The present disclosure relates to low or zero touch provisioning systems and methods of network elements through a Network Address Translation (NAT) gateway. The systems and methods allow a centralized DHCP server such as residing in operators' data communication networks (DCN) to service ZTP, without requiring the DHCP server to reside in the same private IP address space as a network element. The systems and methods do not require any extra provisioning, protocols, and services in order to operate. The systems and methods use standard network configuration and are compatible with the DHCP standard so that it can operate with any DHCP server. Finally, the systems and methods can be applied to both layer 2 networks and layer 3 networks.

Further, the present disclosure relates to low or zero touch provisioning systems and methods of network elements over unnumbered interfaces. This is particularly applicable to network elements which are turned up with unnumbered interfaces, e.g., Optical Service Channels (OSCs), overhead channels on optical ports, Ethernet point-to-point interfaces to shelf controllers or processors, etc. The low or zero touch provisioning systems and methods use a DHCP relay agent on a network element as a delegator of a DHCP client to obtain configuration, package it into the DHCP packets and forward it to the client. The approach is able to deliver the device-specific configuration over the unnumbered point-to-point interface or link.

Additionally, the present disclosure relates to zero touch provisioning over numbered interfaces. Networks (e.g., optical, packet, etc.) are realized through physical network elements interconnected to one another. Network elements are geographically deployed such as in Central Offices (COs), data centers, huts/shelters, customer premises, etc. The conventional approach to installation and provisioning includes field technicians installing, powering up the network element, and configuring provisioning information to enable the network element to communicate on the network. Zero touch provisioning includes automatic configuration of the network element once it is powered up and able to communicate on the network such as to automatically download provisioning information. Low touch provisioning, similar to zero touch provisioning, includes automatic configuration of the network element once the network element is at a minimum configured for network communication. Advantageously, these approaches to provisioning significantly reduce turn up time and configuration errors.

One-Touch Provisioning

One-touch provisioning provides turn-up automation by removing the manual device (initial) configuration work content from the field technicians. The removal of device (initial) configuration work, along with other controller/Data Collection, Analytics and Event (DCAE) automation, will, in turn, remove the need for craft interfaces and software applications. This, in theory, simplifies the field operations in supporting a dynamic mix of multiple-vendor deployment environment by focusing on physical cabling and equipment slotting aspect of the network while relying on the controller and northbound applications to perform the rest of Fault, Configuration, Accounting, Performance, Security (FCAPS) functions. Advantageously, one-touch provisioning has no initial "touch" in the field; field operations focus on physical cabling and equipment slotting aspect of the network, configuration work does not rely on craft interfaces but on the controller and northbound applications, etc. The "touch" happens when a controller correlates a network element to its configuration through the unique identifier of the network element.

Zero-Touch Provisioning

Unlike one-touch turn-up where the controller needs to correlate the physical NE to the provisioning data, zero touch turn-up requires software/firmware smart enough to make such a correlation automatically. The network element cannot be identified by a unique ID since it is not known in advance by the northbound applications. Instead, the provisioning data is determined by the location/connectivity of the network element, i.e. topology information. The identity of the network element can be described by the identity of its neighboring network element(s) and the port(s) connecting to it. FIG. 1 is a network diagram of a network 10 with network elements (NE) 12 (labeled as NEs 12A, 12B, 12C, 12D). For example, the identity of the NE 12C can be described as a specific type of shelf which the NE 12A connects to via an Inter-shelf Local Area Network (ILAN)-IN. ILAN is essentially an Ethernet port between the network elements 12. It also can be described as the specific type of shelf which the NE 12B connects to via ILAN-OUT. Both descriptions are valid. The NEs 12 can connect to a Data Communication Network (DCN) 14. The configuration is validated on the receiving NE 12.

NE Provisioning

Figure 2:
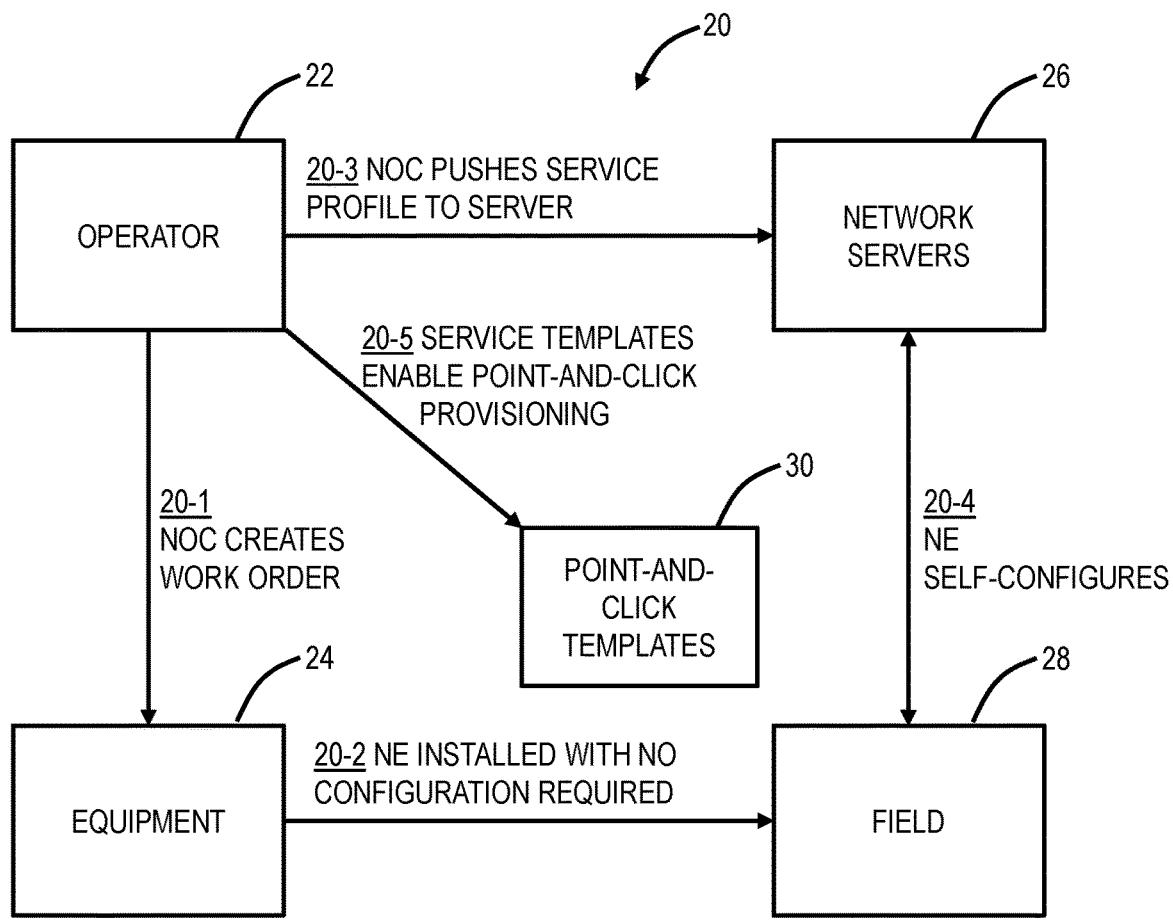
FIG. 2 is a flow diagram of a commissioning process between an operator, an equipment depot, network servers, and a field location.

FIG. 2 is a flow diagram of a commissioning process 20 between an operator 22, an equipment depot 24, network servers 26, and a field location 28. The operator 22 can include engineering, planning, a Network Operations Center (NOC), etc., i.e., personnel associated with a service provider responsible for operating and planning the network. The equipment depot 24 can be a warehouse, a vendor, etc., i.e., a location where network element equipment is located, manufactured, stored, etc. The network servers 26 communicate on the DCN 14 and can include provisioning data for the network elements. Finally, the field location 28 can be a Central Office (CO), Data Center, customer premises, cabinet, shelter, hut, etc., i.e., any location where network elements are deployed in the network.

The commissioning process 20 initiates when the operator 22 creates a work order (step 20-1), i.e., a request for a new network element. The work order is provided to the equipment depot 24 which provides the network element to the field location 28 where the network element is installed with no configuration required (step 20-2). The process of installing the network element at the field location 28 includes physical installation, i.e., installing a shelf in a rack, installing modules or line cards in the shelf, etc., and cabling, i.e., cabling optical and/or electrical interfaces, power, telemetry, etc. Once physically installed and cabled, the network element is turned up, i.e., powered on. It is at this point of physically powering on the network element where low-touch or zero-touch provisioning occurs. The operator 22 provides a service profile, i.e., configuration or provisioning data, to the network servers 26 over the DCN 14 (step 26). Once the network element is powered up at the field location 28, the network element self-configures such as contacting a DHCP server on the DCN 14 for an IP address and downloading the configuration or provisioning data from the network servers (step 20-4). A northbound application such as from the network servers 26 can push additional configurations via the network element's permanent address. Finally, the network element supports point-and-click provisioning via service templates 30 (step 20-5).

Network Deployment

Figure 3:
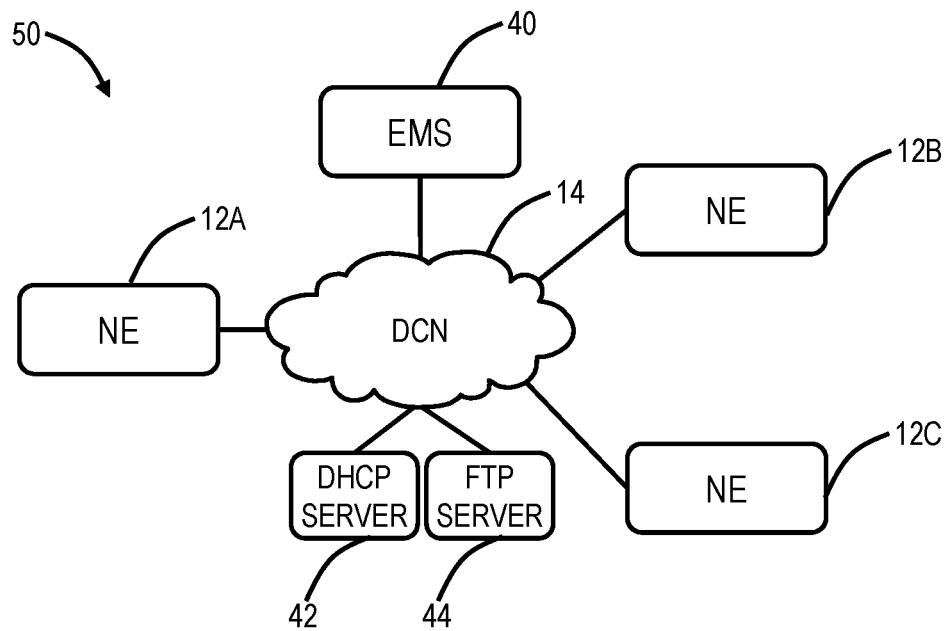

FIG. 3 is a network diagram of a network 50 with network elements 12 connected to the DCN 14 for provisioning information and the like. FIG. 3 includes three network elements 12A, 12B, 12C communicatively coupled to an Element Management System (EMS) 40 via the DCN 14. The network elements 12A, 12B, 12C can include an Add/Drop Multiplexer (ADM), a Multi-Service Provisioning Platform (MSPP), a Digital Cross-Connect (DCS), an optical cross-connect, a Packet-Optical Transport System (POTS), an optical switch, a router, a switch, a WDM/DWDM terminal, an access/aggregation device, etc. That is, the network elements 12A, 12B, 12C can be any type of node which realizes some functionality in the network and which requires on-site provisioning and configuration. The network elements 12 support Low Touch Provisioning (LTP) or Zero Touch Provisioning (ZTP) over the DCN 14.

FIG. 3 illustrates a configuration where the DHCP/FTP servers 42, 44 are located in a layer 3 network. This configuration reduces the EMS management complexity, relative to having the DHCP/FTP servers 42, 44 in the layer 2 network such as on each of the network elements 12A, 12B, 12C. All configuration files are stored in one or a few centralized DHCP/FTP servers 42, 44. The DHCP/FTP servers 42, 44 can be located in the DCN 14 or the network elements 12. Redundancy of the DHCP/FTP servers 42, 44 is achieved by introducing another server and the number of the DHCP/FTP servers 42, 44 is not proportional to the number of network elements 12. However, this configuration requires IP reachability and the IP addresses assigned by the DHCP server 42 must be routable.

Note, in the various examples described herein, the FTP server 44 is described for containing and providing configuration information for ZTP/LTP. Those skilled in the art will recognize other protocols besides FTP are also contemplated for providing the configuration information.

LTP/ZTP Over Unnumbered Interfaces

Figure 4:
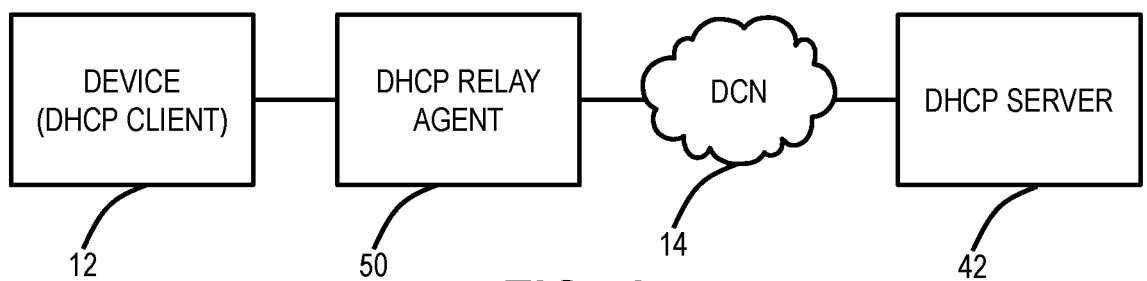
FIG. 4 is a network diagram of a Dynamic Host Configuration Protocol (DHCP) Relay Agent between the network element and the DHCP server over the DCN.

In various embodiments, the systems and methods support LTP/ZTP in the configuration of FIG. 3 where the network elements 12 have unnumbered interfaces to the DHCP/FTP servers 42, 44. Again, LTP/ZTP allows the network elements 12 to be provisioned and configured automatically. The network elements 12 send out a request through DHCP to the DHCP server 42 to obtain the location of its configuration. It then downloads and installs it. In the case that the network element 12 is not in the same layer 2 network with the DHCP server 42, DHCP relay agents are employed as a mediator to forward DHCP packets between clients and servers. FIG. 4 is a network diagram of a DHCP Relay Agent 50 between the network element 12 and the DHCP server 42 over the DCN 14. The network element 12 is determined by the identity of the DHCP Relay Agent 50 as well as the local port connecting to the network element 12. The DHCP Relay Agent 50 can report that information via option 82 along with the DHCP packets sent by the network element 12 to the DHCP server 42 so that the DHCP server 42 can reply with the specific configuration to the network element 12 in terms of the information.

The approach works perfectly if the DHCP client (the network element 12) runs over a numbered interface on the network element 12 because a routable IP address is assigned to the interface so the network element 12 can access to the configuration. However, the technique does not work if the DHCP client runs over an unnumbered interface because 1) the interface does not have its own IP address and 2) the network element 12 is not reachable unless a routing protocol is configured. The routing protocol information cannot be conveyed by the DHCP protocol. Consequently, the network element 12 is not able to reach the configuration, causing ZTP/LTP to fail.

As described herein, the network element 12 includes various interfaces to connect the DCN 14 including Ethernet ports, Optical Service Channels (OSC), Overhead communication channels, etc. Again, as described herein, an unnumbered interface is an interface on the network element 12 which does not have an IP address and cannot receive an IP address which is routable from the DHCP server 42.

Figure 5:
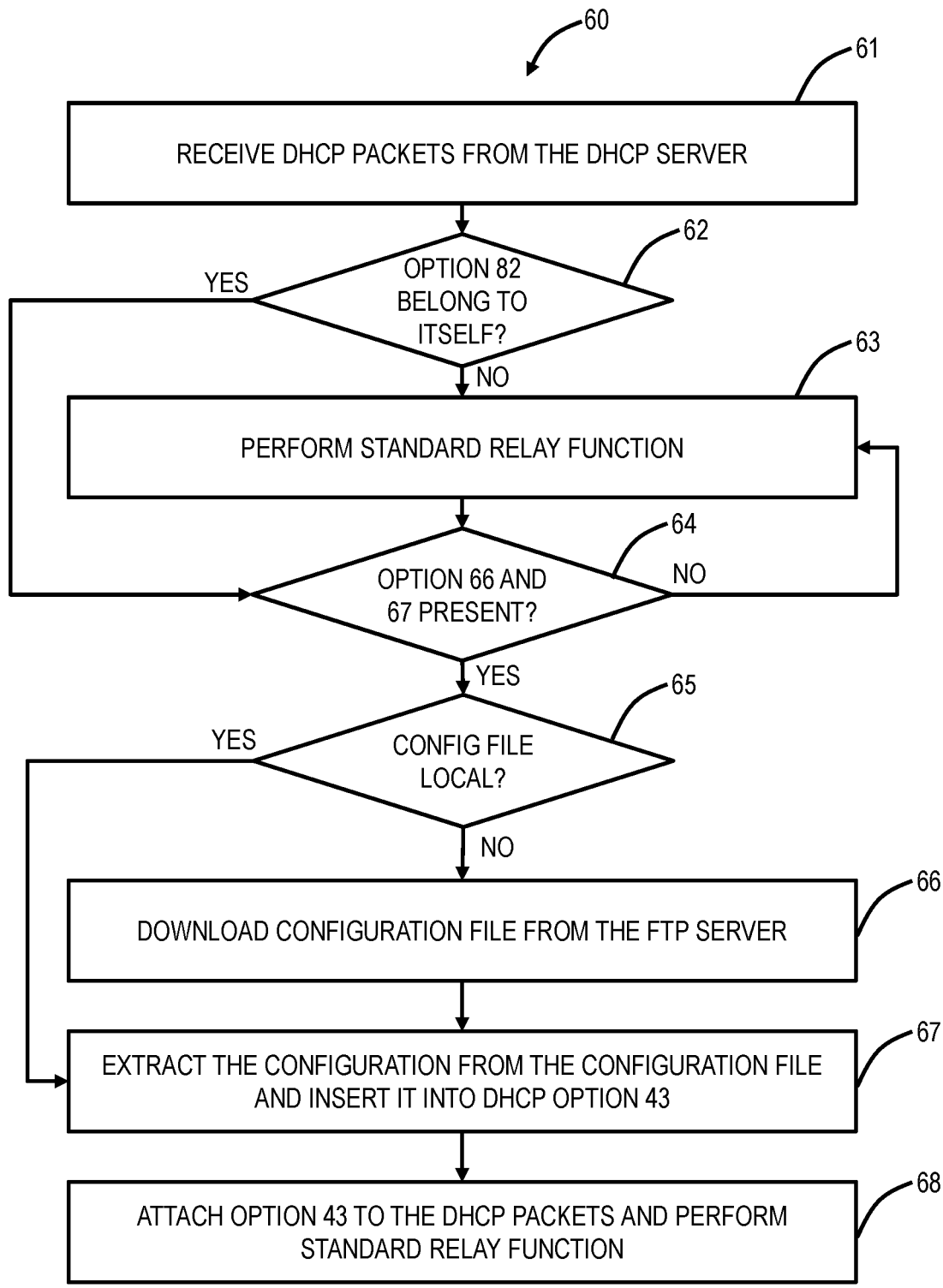
FIG. 5 is a flowchart of a DHCP Relay Agent process adapted to support configuration file distribution using DHCP packets over unnumbered interfaces.

The systems and methods deliver the device-specific configuration to each device over unnumbered interfaces, e.g., unnumbered Ethernet point-to-point interfaces, OSC interfaces, and other optical interfaces, during ZTP/LTP. The systems and methods include modifications on the DHCP Relay Agent 50. FIG. 5 illustrates a flowchart of a DHCP Relay Agent process 60 adapted to support configuration file distribution using DHCP packets over unnumbered interfaces.

The Bootstrap Protocol (BOOTP) [RFC951] describes an IP/User Datagram Protocol (UDP) bootstrap protocol (BOOTP) which allows a diskless client machine to discover its own IP address, the address of a server host, and the name of a file to be loaded into memory and executed. The Dynamic Host Configuration Protocol (DHCP) [RFC2131] provides a framework for automatic configuration of IP hosts. The document "DHCP Options and BOOTP Vendor Information Extensions" [RFC2132] describes options for DHCP, some of which can also be used with BOOTP. Additional DHCP options are described in other RFCs. The contents of RFC951, RFC2131, and RFC2132 are incorporated by reference herein. The DHCP Relay Agent 50 can be located at the network element 12 and can be any host or IP router that forwards DHCP packets between clients and servers. The DHCP Relay Agent 50 can operate as described in RFC3046, "DHCP Relay Agent Information Option," the contents of which are incorporated by reference herein.

When the DHCP Relay Agent 50 receives DHCP packets from the DHCP server 42 (step 61), the process 60 performs the following extra steps to process the packet to support LTP/ZTP over unnumbered interfaces, diverting from the behavior of a standard DHCP relay agent. The process 60 includes checking whether the DHCP packet's option 82 belongs to the DHCP Relay Agent 50 (step 62), and if not, the process 60 includes performing standard relay functions (step 63). DHCP option 82 indicates the DHCP packet includes Relay Agent information. If the DHCP packet's option 82 belongs to the DHCP Relay Agent 50 (step 62), the process 60 includes checking whether DHCP options 66 and 67 (FTP server 44 and configuration location) is present (step 64), and if not, the process 60 includes performing standard relay functions (step 63). Note, the process 60 checks the DHCP options 66 and 67 are present to locate the FTP server 44 and the configuration location, but it is not limited to these two options. Those skilled in the art will recognize the process 60 can use any DHCP other options such as option 125, option 150, etc. to locate a configuration file. Further, while the configuration file is described with respect to the FTP server 44, the process 60 is not limited to the use of the FTP server 44; those skilled in the art recognize any file transfer technique is contemplated.

If the DHCP options 66 and 67 (FTP server 44 and configuration location) are present (step 64), the process 60 first checks whether the configuration file has been downloaded into the local disk (step 65), and if not, the process 60 includes downloading by the DHCP Relay Agent 50 a configuration file from the FTP server 44 to the local disk (step 66). When the options 66 and 67 are present, it must be determined whether the configuration file has been downloaded into the local disk before. If so, that local configuration file can be used; otherwise, the configuration file is downloaded from the FTP server 44. The local copy of the configuration file can be kept for a period of time and then can be removed.

The process 60 then includes extracting the configuration from the configuration file and inserting it into a DHCP packet with option 43 (Vendor Specific information) (step 67), and attaching option 43 to the DHCP packets and performing the standard relay function (step 68). Steps 65-67 provide an option conversion which allows the network element 12 (i.e., the DHCP client) to obtain the configuration information via DHCP packets from the DHCP server 42 through option 43. The DHCP client ignores the IP address, netmask, default route (DHCP option 3) and static route (DHCP option 33) information assigned by the DHCP server 42 because they are not required by unnumbered interfaces. It then extracts the configuration from the DHCP option 43 and configures the network element 12 based thereon. Steps 64-65 are not restricted to employing the FTP server 44 but can be extended to other indications of the location of the configuration file. Of note, the process 60 can also operate with DHCP for IPv6 (DHCPv6). Though it is shown that the option 43 is employed to convey the configuration, other implementation may choose to use other options such as option 125 or options among 224-254. For DHCPv6, the option may be option 17 instead of option 43. Thus, if the relay agent is running on IPv6, it will insert the configuration in option 17 of DHCPv6. The options to locate the configuration file in DHCPv6 are different from DHCP.

DHCP Relay Agent on a Network Element

Figure 6:
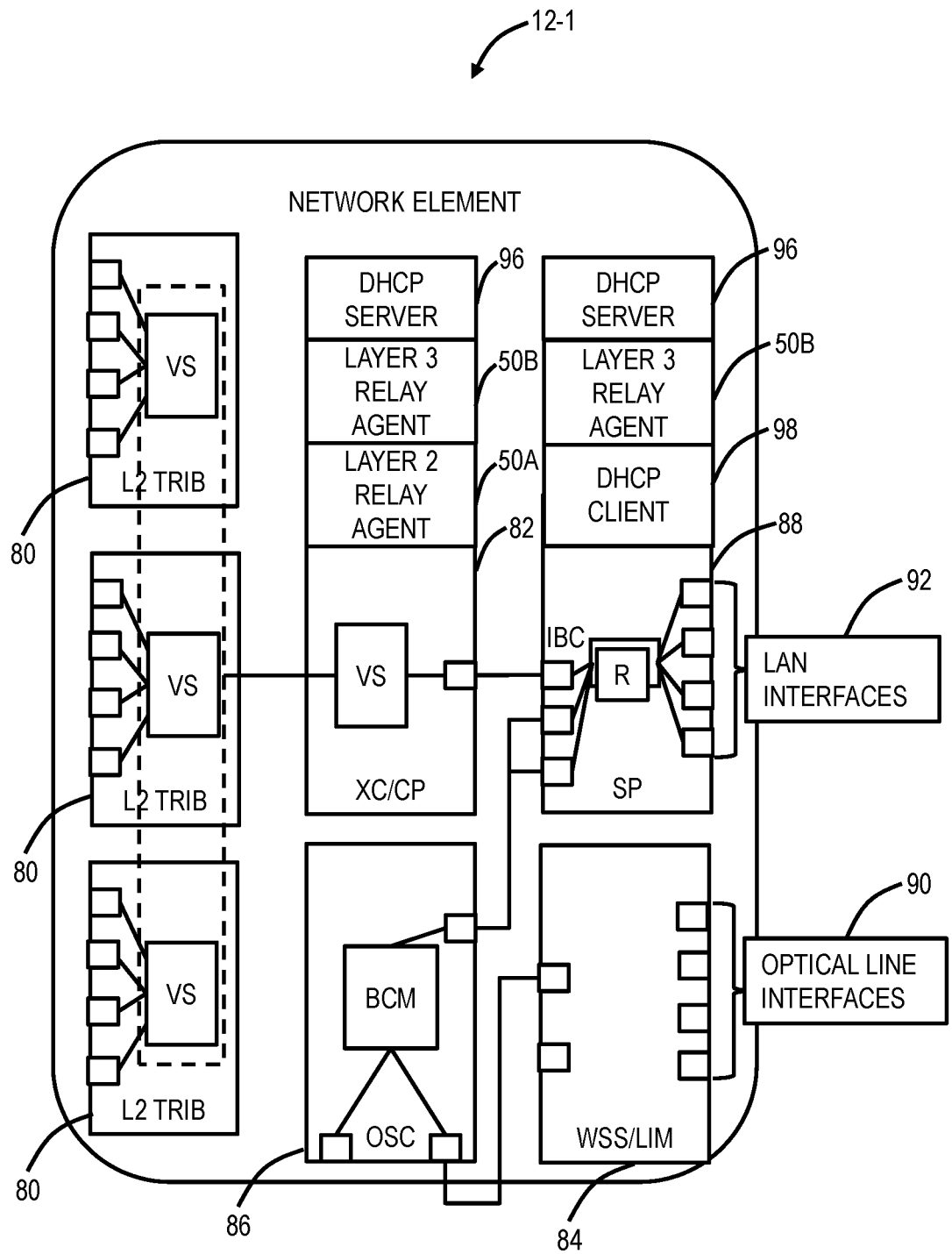
FIG. 6 is a block diagram of an example implementation of the network element.

FIG. 6 is a block diagram of an example implementation of a generic network element 12-1 which can be used to implement the DHCP client 12, the DHCP relay agent 50, and/or the DHCP server 42. In this embodiment, the network element 12-1 is an optical network element supporting Layer 0 (DWDM), Layer 1 (Time Division Multiplexing (TDM) such as Optical Transport Network (OTN)), and Layer 2 (Packet). Those skilled in the art will recognize the systems and methods contemplate operation with any type of network element with unnumbered interfaces. The network element 12-1 includes Layer-2 packet modules 80, one switch module 82, one or more optical switch/line modules (wavelength switches, amplifiers) 84, optical modules (OSC) 86, and a shelf processor (SP) 88.

The Layer-2 packet interface modules 80 provide Layer-2 packet interfaces, such as layer 2 tributaries. The Layer-2 packet interface modules 80 can include Virtual Switches (VS) for distributed layer 2 switching in combination with the switch module 82. The switch module 82 is configured to switch channels, timeslots, tributary units, packets, etc. between the layer-2 packet interface modules 80. In an embodiment, the Layer-2 packet interface modules 80 can form ingress and egress virtual switches with the switch module 82 as center stage switch(es) for a three-stage switch, e.g. a three-stage Clos switch.

The optical switch/line modules 84 can be configured to provide ingress and egress to external connections on the links to/from the network element 12-1. Other configurations and/or architectures are also contemplated. The optical line modules 84 can include optical line interfaces 90 external to the network element 12-1. In an embodiment, the optical line interfaces 90 can provide connectivity to the DCN 14, such as via overhead, an OSC, etc.

The optical modules 84 can include optical amplifiers (e.g., EDFA) Etc. The shelf processor 88 can provide Operations, Administration, Maintenance, and Provisioning (OAM&P) access; user interface ports; and the like. Of note, the optical line interfaces 90 and/or the LAN interfaces 92 are unnumbered interfaces over which the LTP/ZTP is performed. Note, the LAN interfaces 92 can also include numbered interfaces.

Those of ordinary skill in the art will recognize the network element 12-1 can include other components which are omitted for illustration purposes, and that the systems and methods described herein are contemplated for use with a plurality of different network elements with the network element 12-1 presented as an example type of network element. For example, in another embodiment, the network element 12-1 may not include the switch modules 82, but rather have the corresponding functionality in the modules 86, 84 (or some equivalent). For the network element 12-1, other architectures providing ingress, egress, and switching are also contemplated for the systems and methods described herein. In general, the systems and methods described herein contemplate use with any network element providing switching of channels, timeslots, tributary units, packets, wavelengths, etc. Furthermore, the network element 12-1 is merely presented as one example network element for the systems and methods described herein.

The network element 12-1 includes a layer 2 Relay Agent 50A, a layer 3 Relay Agent 50B, DHCP servers 96, and a DHCP client 98. In an embodiment, the Relay Agents 50A, 50B can run on both the shelf processor 88 and the switch module 82. Of course, other embodiments are also contemplated. The network element 12-1 can be configured for layer 2 relay only or for layer 3 relay only. The layer 2 Relay Agent 50A can forward DHCP messages to another layer 2 port or shelf processor 88 for layer 3 relay, between the DHCP servers 96 and the DHCP client 98. The DHCP can be resolved in the layer 2 domain or the layer 3 domain depending on the location of the LTP/ZTP server (the DHCP/FTP servers 42, 44). The switch module 82 can be able to identify the port of incoming traffic.

The FTP server 44 can be referred to as a configuration server which has a provisioning profile (i.e., a configuration file) for the network element 12-1. Note, the FTP server 44 can in some embodiments be combined with the DHCP server 42. The address of the DHCP/FTP servers 42, 44 is known by the network element 12-1, the layer 2 Relay Agent 50A, and the layer 3 Relay Agent 50B.

LTP/ZTP network element commissioning (provisioning) can include two stages—1) communication configuration and 2) additional network element provisioning. For the communication configuration, LTP/ZTP has to bring up the optical line interfaces 90 and/or the LAN interfaces 92 with a DHCP client enabled thereon. The DHCP Relay Agent 50A, 50B pointing to the DHCP server 42 has to be enabled on the neighboring network element 12.

The network element 12-1 negotiates with the DHCP server 42 about the configuration information through option 3 for receiving a default route, option 33 for receiving a static route, option 60 for identifying vendor type when communicating with DHCP servers, option 61 for identifying a DHCP client and configuration, option 66 for the address of the FTP server 44, and option 67 for the directory on the FTP server 44 that contains the command files. The network element 12-1 can notify a northbound controller once the communication configuration is complete.

Stage 2 is for the additional network element provisioning, at this stage, the network element 12-1 is able to reach the FTP server 44. The network element 12-1 then requests the FTP server 44 to send additional configuration commands in order to provision additional services (e.g., optical, other facilities). This could be achieved by downloading a configuration file from the FTP server 44, or this could be achieved by requesting a configuration server to TELNET back to the network element 12-1 and configure it through Transaction Language-1 (TL1) commands, Command Line Interface (CLI), NETCONF, etc.

DHCP Relay Agent Example Operations

Figure 7:
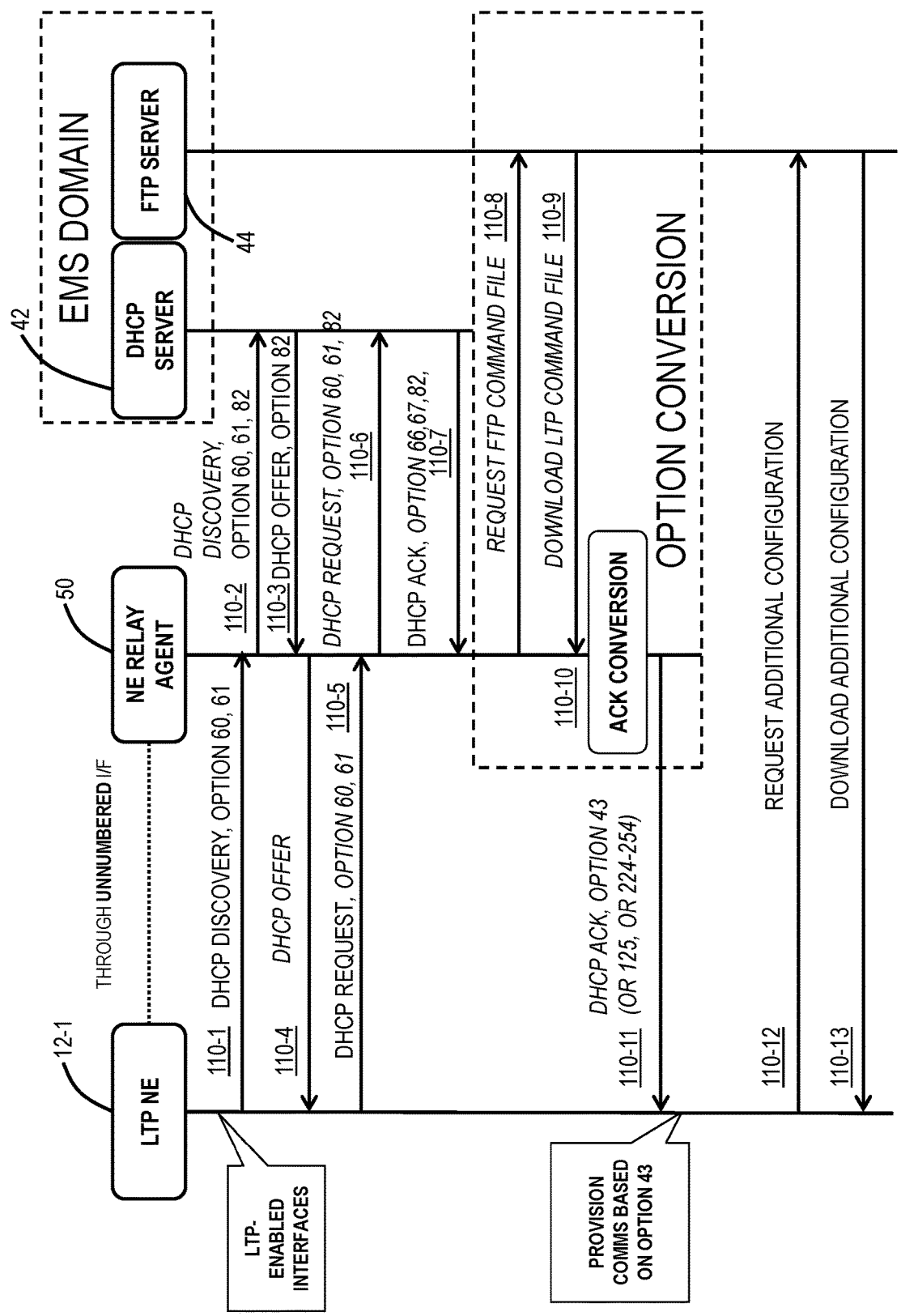
FIG. 7 is a flow diagram of the network element connecting to the DHCP Relay Agent through an unnumbered interface with the DHCP Relay Agent performing option conversion.

FIG. 7 is a flow diagram of the network element 12-1 connecting to the DHCP Relay Agent 50 through an unnumbered interface with the DHCP Relay Agent 50 performing option conversion. In FIG. 7, the flow is illustrated between the network element 12-1, the DHCP Relay Agent 50, and an EMS domain including the DHCP server 42, and the FTP server 44. Note, the servers 42, 44 can be combined or separate and other file transfer techniques are contemplated in addition to FTP.

In FIG. 7, the network element 12-1 communicates to the DHCP Relay Agent 50 through an unnumbered interface with is LTP/ZTP enabled. Once powered up, the network element 12-1 sends a DHCP discovery, option s60 and 61 to the DHCP Relay Agent 50 (step 110-1). The DHCP Relay Agent 50 sends a subsequent corresponding DHCP discovery with option 82 attached to the DHCP server 42 (step 110-2) and the DHCP server 42 sends back a DHCP offer to the DHCP Relay Agent 50 (step 110-3) which sends the DHCP offer to the network element 12-1 (step 110-4). The network element 12-1 sends a DHCP request to the DHCP Relay Agent 50 (step 110-5) which then sends the DHCP request with options 82 to the DHCP server 42 (step 110-6).

The DHCP server 42 sends back a DHCP acknowledgment (ACK) with options 66, 67 to the DHCP Relay Agent 50 (step 110-7).

The DHCP Relay Agent 50 in response to the DHCP ACK sends an FTP request for a configuration file to the FTP server 44 (step 110-8). The FTP server 44 sends the LTP/ZTP configuration file to the DHCP Relay Agent 50 (step 110-9). The DHCP Relay Agent 50 performs an ACK conversion (option conversion) (step 110-10) and sends/forwards the configuration file to the network element 12-1 over the unnumbered interface using a DHCP ACK with option 43 (or 125, or 224-254) with the configuration file therein (step 110-11). Once the network element 12-1 receives the configuration file, LTP/ZTP provisioning occurs, and the network element 12-1 can now reach the FTP server 44, request additional configuration from the FTP server 44 (step 110-12) and receive the additional configuration (step 110-13). Here, in FIG. 7, the IP address, netmask and default routes assigned by the DHCP server 42 are ignored, and the DHCP server does not configure option 43. In FIG. 7, the relay agent 50 can verify whether the configuration file exists locally before it requests a FTP to download the file from the FTP server 44. If the configuration file has been downloaded locally before, the relay agent 50 does not need to download the file from the FTP server 44, instead, it uses the local copy for option conversion. The local copy is kept for a period of time and then deleted from the local system. It is noted that the time that it takes for the relay agent 50 to download the configuration file may be long enough to cause the DHCP client 12-1 to time out. In this case, the LTP NE 12-1 will reinitiate the LTP process.

LTP/ZTP Process by the Network Element

Figure 8:
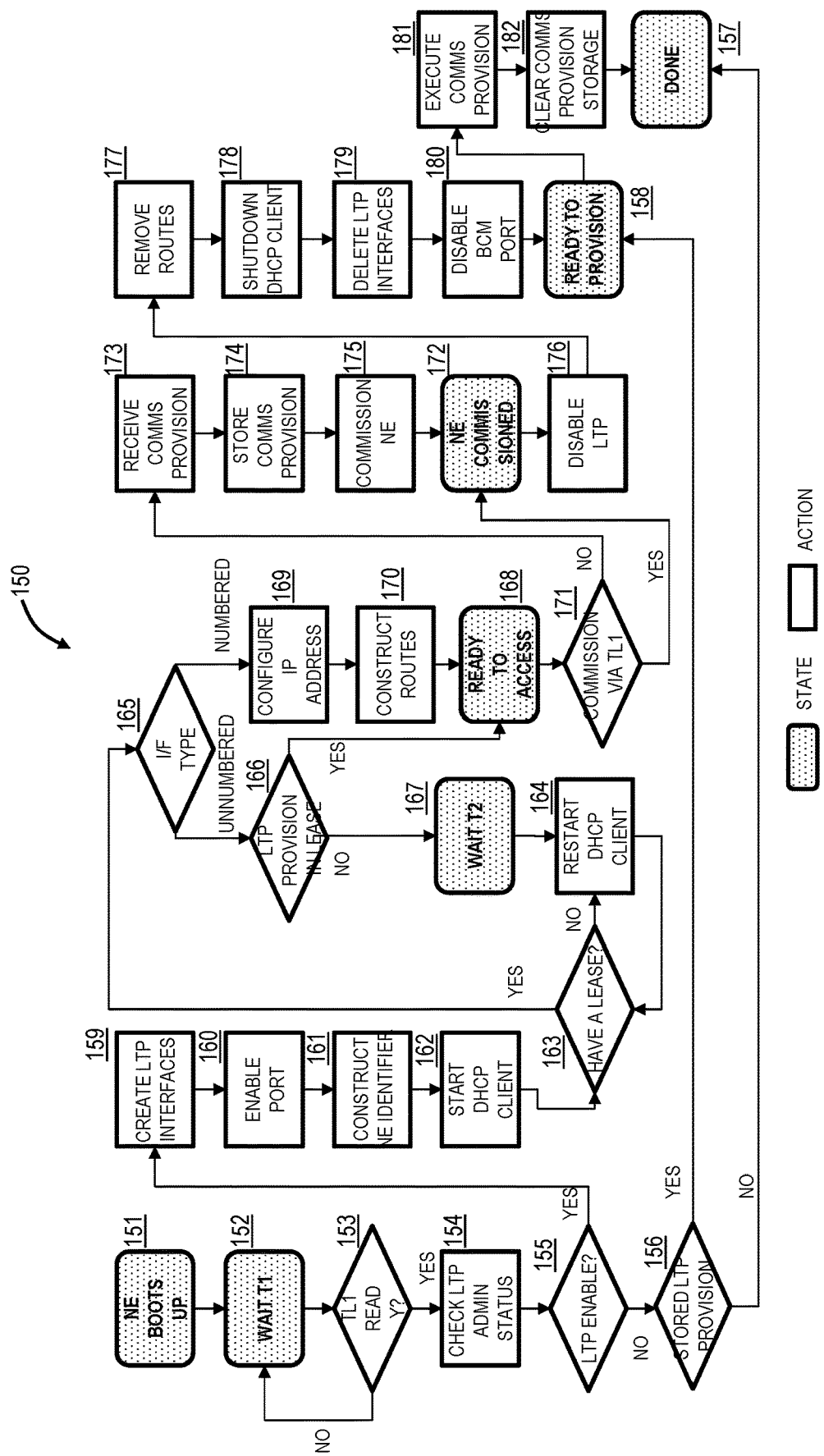
FIG. 8 is a flowchart of an LTP/ZTP process performed by the network element.

FIG. 8 is a flowchart of an LTP/ZTP process 150 performed by the network element 12-1. The network element 12-1 boots up (step 151), waits for a predetermined time (T1) (step 152) until T1 is ready (step 153). The process 150 includes checking the LTP (or ZTP) administrative status (step 154) to determine if LTP/ZTP is enabled (step 155). If LTP/ZTP is not enabled, the process 150 checks if LTP/ZTP provisioning information is stored (step 156), and if not, the process 150 ends (step 157), and if LTP/ZTP provisioning information is stored (step 156), the process 150 is ready to provision the network element 12-1 (step 158).

If LTP/ZTP is enabled (step 155), the process 150 includes creating LTP interfaces (step 159), enabling the port (step 160), constructing a network element identifier (step 161), and starting a DHCP client 98 (step 162). The BROADCAST flag must be set for the DHCP packets sent by the DHCP client 98 (step 162). The process 150 includes determining if the DHCP client 98 has a lease (step 163) and, if not, restarting the DHCP client 98 (step 164). Once the DHCP client 98 has a lease (step 163), the process 150 is different based on whether the interface is numbered or unnumbered (step 165). If the interface is unnumbered, the process 150 checks if the LTP provisioning information is in the option 43 of the lease (step 166), and, if not, the process 150 includes waiting another predetermined time (T2) and restarting the DHCP client 98 (step 164). If the LTP provisioning information is in the lease, the process 150 is ready to access the FTP server 44 (step 168).

If the interface is numbered (step 165), the process 150 includes configuring the IP address and netmask (step 169), constructing routes (step 170), and the process 150 is ready to access the FTP server 44 (step 168). The process 150 checks if the network element 12-1 can be configured via TL-1 (step 171), and, if so, the network element is commissioned (step 172). If the network element 12-1 cannot be configured via TL-1 (step 171), the network element 12-1 receives communications for provisioning (step 173), stores the provisioning information (step 174), and commissions the network element 12-1 (step 175).

After the network element 12-1 is commissioned (step 172), LTP/ZTP is disabled (step 176), routes are removed (step 177), the DHCP client 98 is shutdown (step 178), LTP interfaces including IP addresses are deleted (step 179), the port is disabled (step 180), and the network element 12-1 is ready to provision (step 158). Once ready to provision, the process 150 includes executing provisioning (step 181) in terms of the stored provisioning information (step 174) and clearing the stored provisioning information (step 182).

The LTP/ZTP can be enabled by default when the network element 12-1 comes from manufacturing. After the network element 12-1 boots up, the LTP/ZTP can be disabled if the network element 12-1 is commissioned. The type/category of the network element 12-1 can be carried by DHCP option 60, and a unique client identifier can be carried via option 61. For example, the unique client identifier can be a serial number.

For unnumbered interfaces, the DHCP client 98 can process the lease as follows: the IP address and netmask is not configured on the interface; option 3 is ignored, and no default routes are installed into the routing table; option 33 is ignored, and no static routes are installed into the routing table; if Vendor Specific Information (option 43) is present in the lease, the DHCP client follows instructions embedded in the option to provision the NE; otherwise, the DHCP client rejects the lease, waits for a while, and starts the DHCP negotiation process again.

DHCP Relay Agent

Figure 9:
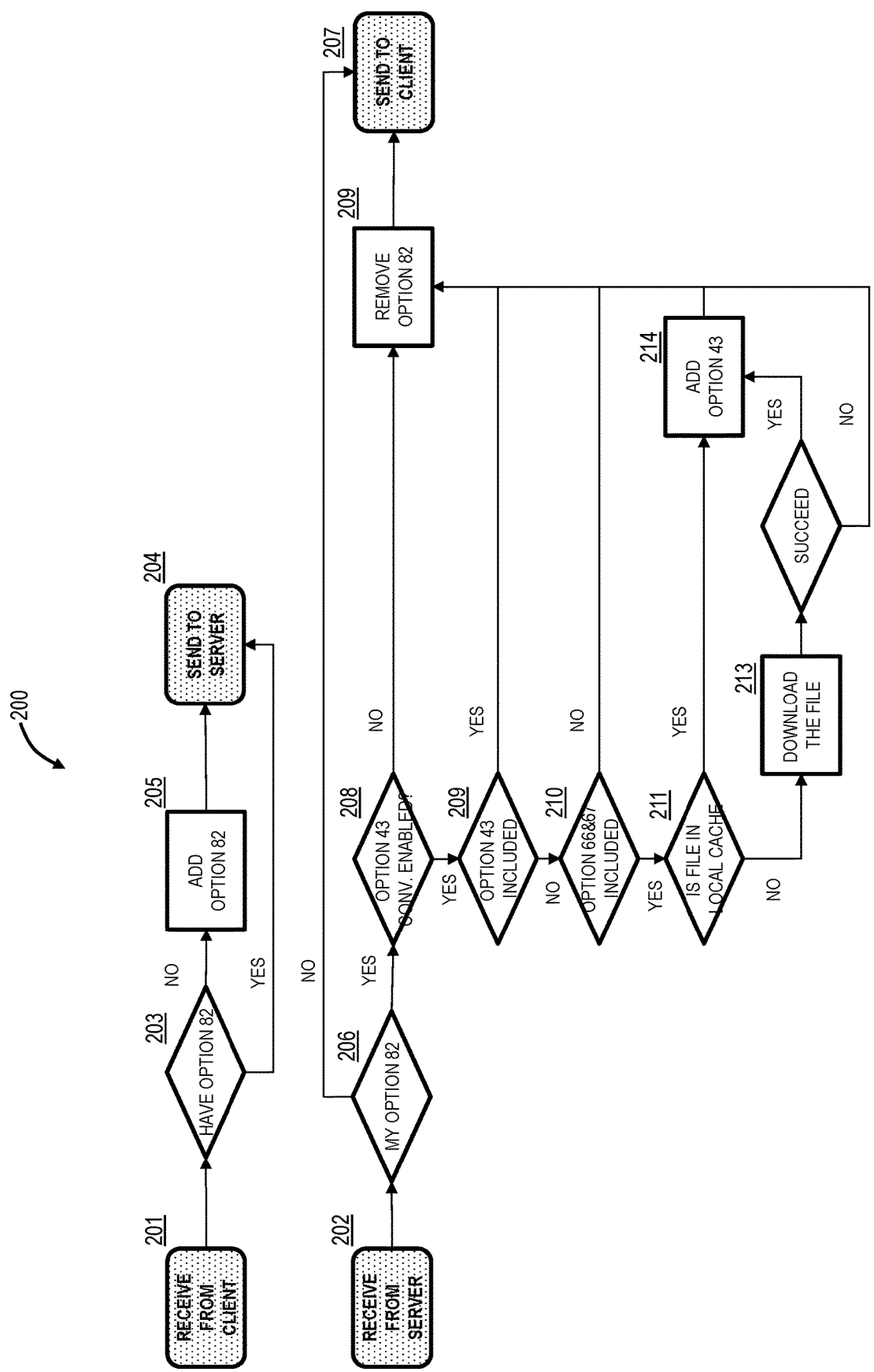
FIG. 9 is a flowchart of a DHCP Relay Agent process.

FIG. 9 is a flowchart of a DHCP Relay Agent process 200. The DHCP Relay Agent 50 can be either of the DHCP Relay Agents 50A, 50B. The DHCP Relay Agent 50 is enabled on an interface connecting to the network element 12-1. Option conversion is automatically enabled if the interface is unnumbered; otherwise, it is disabled. The process 200 operates based on whether the DHCP Relay Agent receives DHCP packets from the DHCP client (step 201) or from the DHCP server 42 (step 202). When packets are received from the DHCP client (step 201), the process 200 checks if the data includes option 82 (step 203), and, if so, the process 200 includes forwarding the packets to the DHCP server 42 (step 204), and, if not, the process 200 includes adding option 82 (step 205).

When a response packet is received from the DHCP server 42 (step 202), the process 200 includes checking if the data is set to option 82 of the DHCP Relay Agent 50 (step 206), and, if not, the process 200 include forwarding the packet to the DHCP client (step 207). If the data is set to option 82 of the DHCP Relay Agent 50 (step 206), the process 200 includes checking if option conversion is enabled (step 208), and, if not, the process 200 includes removing the option 82 (step 209) and forwarding the response packet to the client (step 207). If the option conversion is enabled (step 208), the process 200 includes checking if option 43 is included, and if so, the process 200 includes removing the option 82 (step 209) before sending to the client (step 207). If option 43 is not included (step 209), the process 200 includes checking if options 66, 67 are included (step 210), and, if not, the process 200 includes removing the option 82 (step 209) and sending to the client (step 207). If options 66, 67 are included (step 210), the process 200 includes checking if the configuration file is in a local cache (step 211), and, if so, adds option 43 (step 212) and sends the configuration file. If the configuration file is not in a local cache (step 211), the process 200 includes downloading the configuration file (step 213).

The DHCP Relay Agent 50 is configured to download the configuration file on behalf of the network element 12-1, i.e., the DHCP client. The file needs to be stored locally on the network element 12-1 running the DHCP Relay Agent 50. The life cycle of the file needs to be managed (e.g., the file should be removed after 30 minutes).

Although the diagram shows that option 43 is used for conversion. It is noted that other options can also be employed such as options among 224-254 or option 125.

DHCP Server

The DHCP server 42 is able to provide the following two configuration options: Option 1: Use Client Identifier to identify a configuration; and Option 2: Use Relay Agent Information Option (option 82) to identify a configuration. For Option 1, the DHCP server 42 or northbound application must have knowledge of the identity of the individual network element and associate the client identifier with a particular configuration. A manual intervention (a.k.a. "touch") is required to make the above association. The client identifier becomes the "key" to identify the individual configuration. For Option 2, the DHCP Relay Agent 50 provides its own identity (not necessary the Client Identifier) as well as local circuit information to assist the DHCP server 42 or northbound application to determine a configuration for the network element 12. The information determines the location of the network element 12 and the configuration in terms of the location without manual intervention.

LTP/ZTP Over Numbered Interfaces

Figure 10:
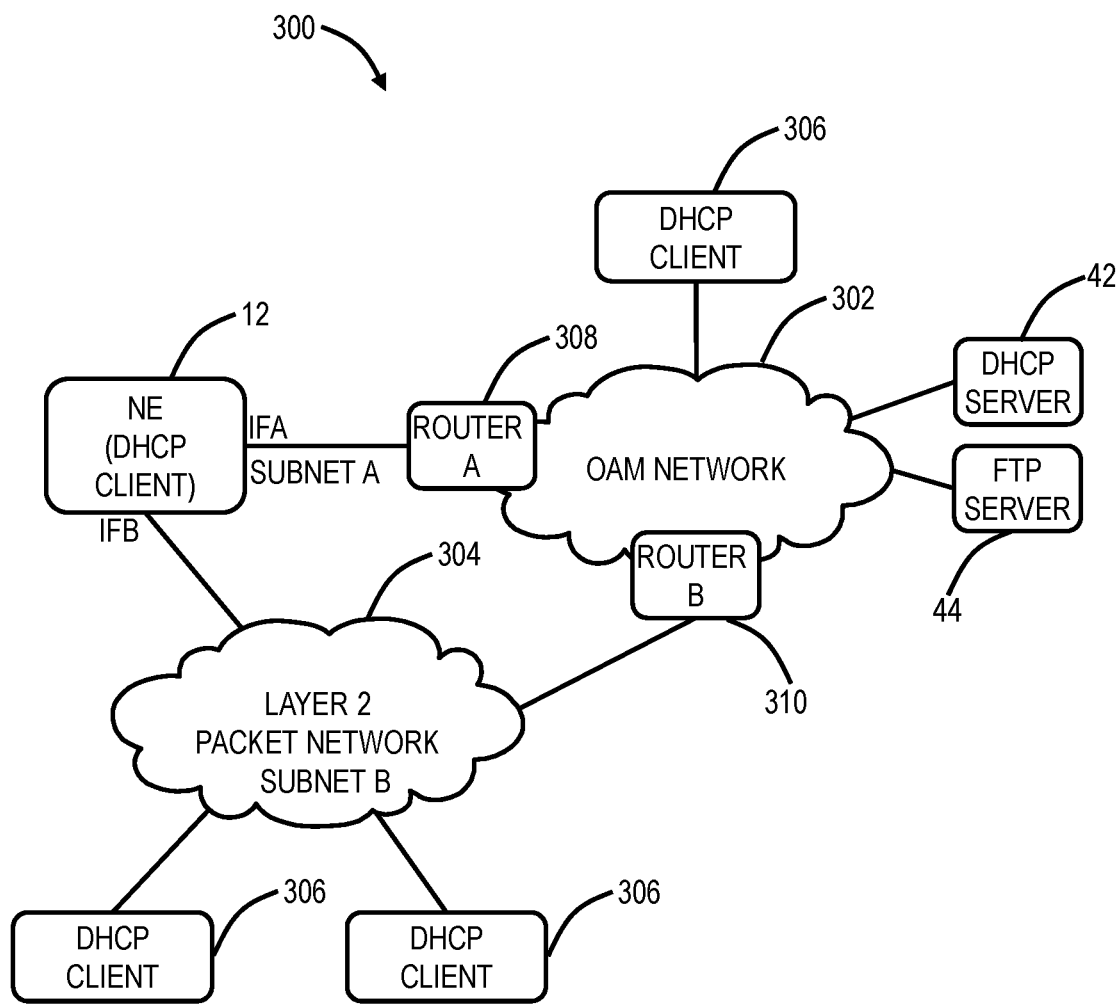
FIG. 10 is a network diagram of a network with a network element with multiple numbered interfaces communicating to a single DHCP server.

FIG. 10 is a network diagram of a network 300 with a network element 12 with multiple numbered interfaces communicating to a single DHCP server 42. The network 300 includes an OAM network 302, a layer 2 packet network 304, DHCP clients 306, and routers A, B 308, 310. The network element 12 can have two types of interfaces (IFA, IFB)—those connecting to Data Communication Networks (DCN) for Operations, Administration, and Maintenance (OAM) purpose (herein referred to as the OAM network 302) and those connecting to the layer 2 packet network 304. The network element 12 can provide Zero Touch Provisioning (ZTP) through both types of interfaces. In FIG. 6, the LAN interfaces 92 and the optical line interfaces 90 can participate in the OAM network 302 while the Layer-2 packet interface modules 80 can participate in the layer 2 packet network 304.

As described herein, the operator configures the DHCP server 42 and the FTP server 44 for ZTP purposes. The DHCP server 42 has been configured in such a way that each device configuration has an associated unique identifier indicated by the DHCP client identifier in the DHCP packets. The client identifier can be the serial number of the device (network element 12). The interface IFA connects to the OAM network 302 while the interface IFB participates in the layer 2 packet network 304. Both interfaces are numbered interfaces meaning an IP address is required for the interface to communicate. The IP subnet assigned to IFA and IFB must be different (i.e., not overlapping) in order to allow IP forwarding to find the proper next hop. For illustration purposes, assume the IFA is connecting to IP subnet A and the IFB connecting to IP subnet B.

Without knowing the topology after boot up, the network element 12 has to run DHCP clients 98 on both IFA and IFB. DHCP client 98 instances on the network element 12 send DHCP packets out IFA and IFB and waits for a DHCP response which specifies the interface IP address and location of the configuration file from the DHCP server 42.

When the DHCP server 42 receives the DHCP packets from the network element 12, it cannot distinguish whether they are sent via IFA or IFB because the IP address assignment and configuration correlation is based on the unique identifier of the network element 12 which is the same. Assume the DHCP server 42 is configured to associate subnet B to the network element 12. Then the DHCP server 42 assigns the subnet B in a response to the DHCP requests from the network element 12. If the DHCP requests sent via IFA get the response earlier than IFB, the subnet B is assigned to the IFA instead of the IFB. Essentially once the subnet B is configured to the IFA, it cannot be assigned to the IFB. Now when the network element 12 attempts to contact the FTP server 44 for its configuration, the operation cannot succeed because the subnet configured on the IFA does not match the subnet configured on the router A 308. Consequently, the network element 12 is not able to be provisioned and is not able to be accessed remotely.

The systems and methods resolve this problem in such a way that the DHCP clients 98 on the network element 12 are smart enough to automatically determine and apply the IP assignment to the proper interface IFA, IBA. Generally, when the DHCP client receives a lease from a numbered interface, instead of configuring the interface immediately, it determines which interface the IP assignment (including IP address, netmask, and default route) is should be applied to. In order to achieve that, the network element 12 uses Address Resolution Protocol (ARP) to probe the gateway (obtained from the lease) on each numbered interface to determine whether the interface connects to the specified gateway (in this example, the routers A, B 308, 310). Then the network element 12 performs a check on the assigned address to ensure that the address is not already in use. Once an interface is identified by the above procedure, the IP address is applied to it even if it is different from the interface on which the lease is received (such as is the case described above).

Figure 11:
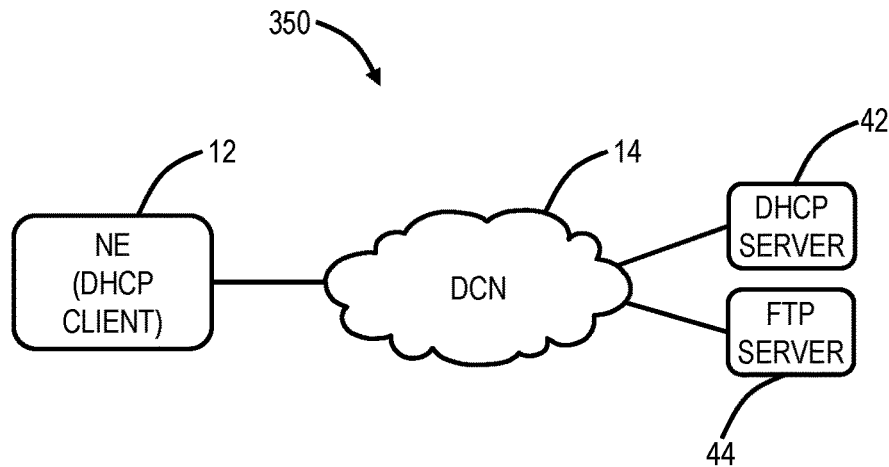
FIG. 11 is a network diagram of a network for zero touch provisioning over a numbered interface with a single DHCP server and FTP server.
Figure 12:
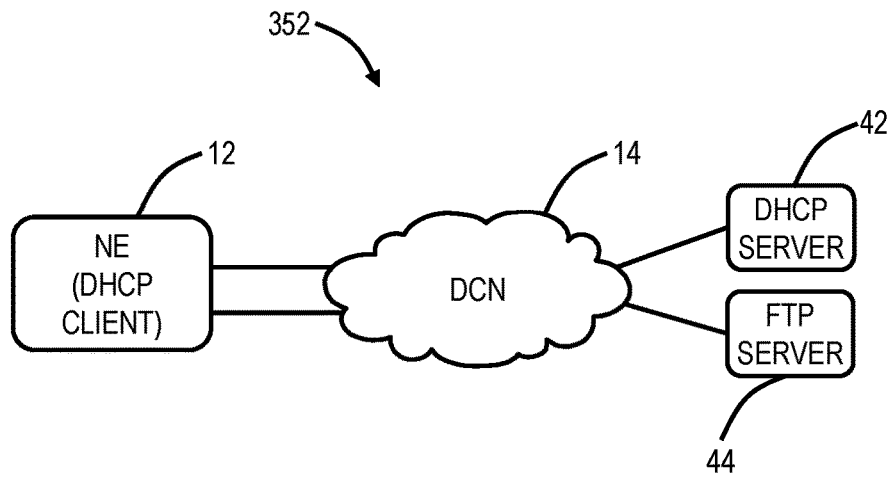
FIG. 12 is a network diagram of a network for zero touch provisioning over multiple numbered interfaces with a single DHCP server and FTP server.
Figure 13:
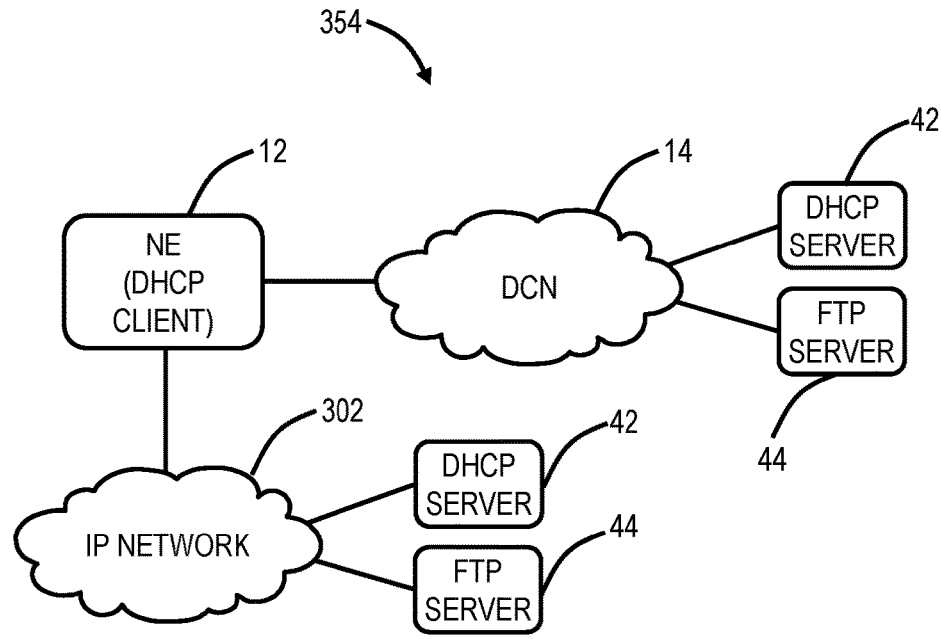
FIG. 13 is a network diagram of a network for zero touch provisioning over multiple numbered interfaces with multiple DHCP servers and FTP servers.

FIG. 11 is a network diagram of a network 350 for zero touch provisioning over a numbered interface with a single DHCP server 42 and FTP server 44. FIG. 12 is a network diagram of a network 352 for zero touch provisioning over multiple numbered interfaces with a single DHCP server 42 and FTP server 44. FIG. 13 is a network diagram of a network 354 for zero touch provisioning over multiple numbered interfaces with multiple DHCP servers 42 and FTP servers 44.

Again, ZTP or LTP allows the network element 12 to be provided and configured automatically. In FIG. 11, the network element 12 sends out a request through DHCP to the DHCP server 42 to obtain the location of its configuration (the FTP server 44). Then the network element 12 downloads the configuration and installs it.

With respect to multiple interfaces, there are several approaches to deploying ZTP. In FIG. 12, the network element 12 has two numbered interfaces connected to the DCN 14. A first approach uses a single DHCP server 42. When the DHCP server 42 receives the DHCP request from the network element 12, there are three approaches to determine a configuration specifically to the network element 12 that sends out the DHCP request. First, a unique client identifier of the network element 12 can be mapped to a configuration. Since each network element 12 has a unique identifier such as a serial number which can be used as the client identifier, the DHCP server 42 is able to identify the network element 12 and assign the specific configuration to it. However, this is restricted to a single numbered ZTP interface supported per network element 12, which is not always the case as in FIG. 12.

Second, the interface Media Access Control (MAC) address of the network element 12 can be mapped to a configuration. If the MAC address is unique per physical port interface, the DHCP server 42 is able to assign the specific configuration to the network element 12. For vendors that have a single MAC address per network element 12 (all interfaces share the same MAC), this is equivalent to the first approach above. For vendors that have a unique MAC per interface, this approach is able to overcome the challenge of multiple interfaces. However, practically, this approach is rarely used because it could be a large logistic effort to collect and manage all interface MAC addresses for all network elements, especially in larger networks.

Third, option 82 in DHCP can be used and added by DHCP relay agents 50 to map to a configuration. The option 82 data can contain the identity of the DHCP relay agent 50 as well as the local port of the DHCP relay agent 50 connecting to the network element 12, which can be used to identify the device 12 as long as the link to the relay agent 50 is point-to-point, star network topology, etc. However, the numbered interface can be employed to connect to a layer 2 packet network 304 causing this approach to fail. In general, this approach does not apply as long as one of the ZTP interfaces connects to the layer 2 packet network 304.

In FIG. 13, another approach uses multiple DHCP servers 42, one for each subnet. In this approach, a dedicated DHCP server 42 must be employed for each IP network that the interface participates in. Therefore, a different IP address can be assigned to each numbered interface of the network element 12 independently.

LTP/ZTP Over Multiple Numbered Interfaces

The systems and methods allow ZTP to be enabled on multiple numbered interfaces per network element 12, which overcomes the restriction of a single numbered ZTP interface per device 12. Meanwhile, the systems and methods use a unique identifier per network element 12 instead of MAC address per interface to identify the specific configuration of the network element 12, which addresses the logistic concern of managing the MAC addresses, the performance of the DHCP server 42 and scalability. Furthermore, the systems and methods apply as well to configurations with the layer 2 packet network 304. The systems and methods do not require multiple DHCP servers 42, which simplifies the server/network management.

Figure 14:
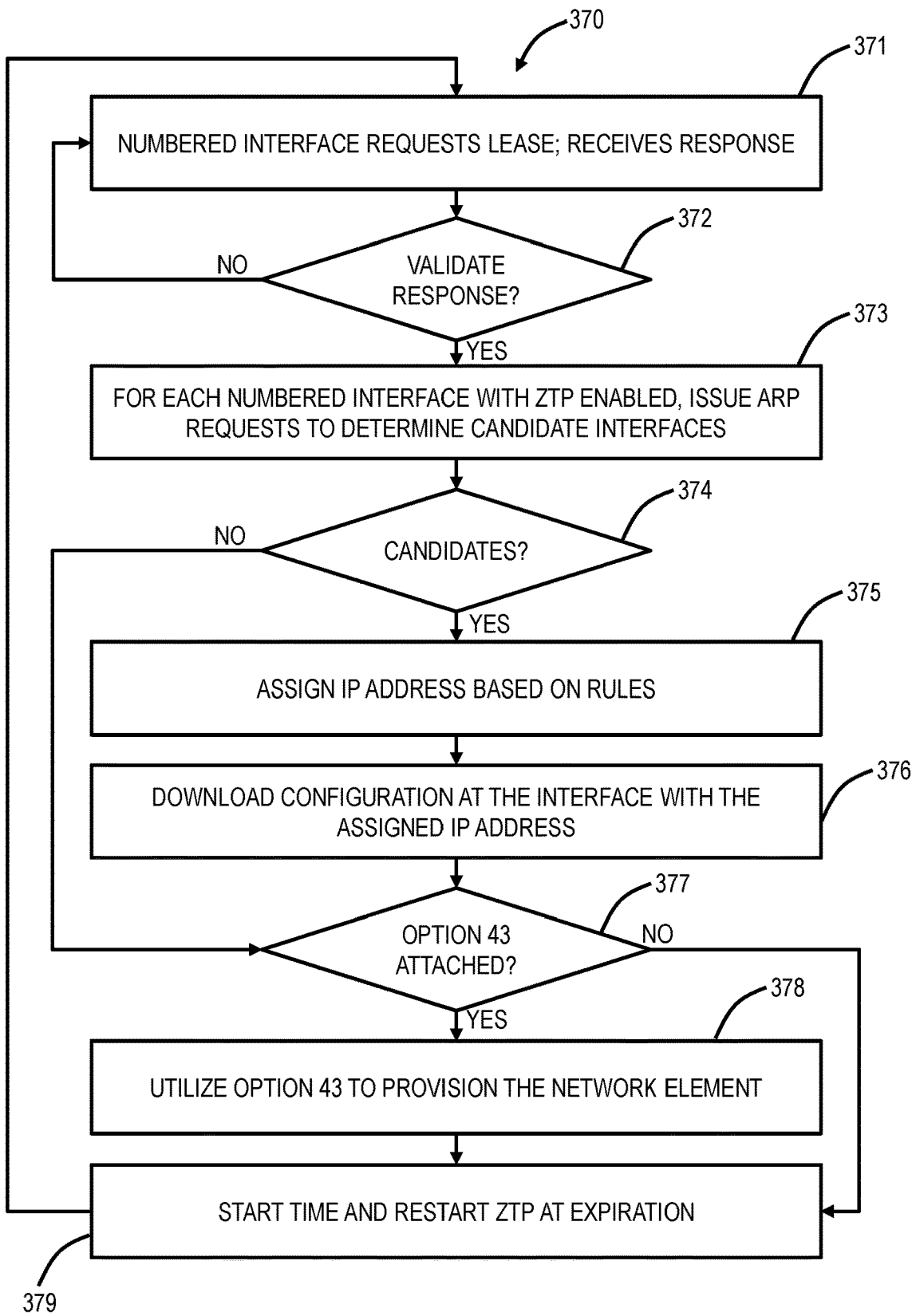
FIG. 14 is a flowchart of a process for zero touch provisioning of a network element having multiple numbered interfaces.

FIG. 14 is a flowchart of a process 370 for zero touch provisioning of a network element having multiple numbered interfaces. A numbered interface on which ZTP is enabled requests a lease (DHCP request) and when a valid lease is received on the numbered interface (step 371), the IP address, netmask, and gateway are not immediately applied to the numbered interface. Instead, the process 370 checks to validate the response (step 372).

For the validation, the network element checks that the IP address and gateway are unicast addresses, the netmask is non-zero, and the gateway is a unicast address and is part of the assigned IP subnet. If any fail, the lease is rejected and the ZTP is restarted on the numbered interface (step 371). Further, for the validation, if the IP address has already been configured on another numbered interface, the lease is rejected, and the ZTP is restarted on the numbered interface (step 371).

For each numbered interface with ZTP enabled, ARP requests are issued to determine candidate interfaces (step 374). On each numbered interface where the ZTP is enabled, and the IP address has not been assigned, step 374 can include:

A) The network element issues ARP requests for the gateway address to the numbered interface (Gateway detection). By doing so, the network element 12 must fill in its own hardware address as the sender's hardware address, and 0 as the sender's IP address, to avoid confusing ARP caches in other hosts on the same subnet.

B) If an ARP response is received on the numbered interface, go to step C) because it means that the gateway connects to the numbered interface; otherwise, loop to the next numbered interface.

C) The network element issues ARP requests for the assigned IP address to the numbered interface (duplicate address detection). By doing so, the network element must fill in its own hardware address as the sender's hardware address, and 0 as the sender's IP address, to avoid confusing ARP caches in other hosts on the same subnet.

D) If an ARP response is not received on the numbered interface, mark the numbered interface as a candidate because it means that no duplicate IP address is detected on the subnet.

E) loop to the next numbered interface (if any).

If there are candidate interfaces (step 374), the IP assignment can be applied to one of them based on rules (step 375). The rules include—if the numbered interface on which the DHCP response is received is a candidate, the IP assignment can be applied to it. Otherwise, all other interfaces have an equal preference and one of them can be picked arbitrarily. The process 370 includes downloading the configuration at the numbered interface with the assigned IP address (step 376).

Otherwise, there is no candidate interface (step 374). In this case, the process 370 includes determining whether the option 43 is attached to the lease (DHCP response) and can be used for configuration (step 377). If so, the network element utilizes the configuration in option 43 to provision the network element (step 378). Otherwise, a timer is started, the lease is rejected, and ZTP will be restarted on the numbered interface at timer expiration (step 379).

NAT Gateway

Figure 15:
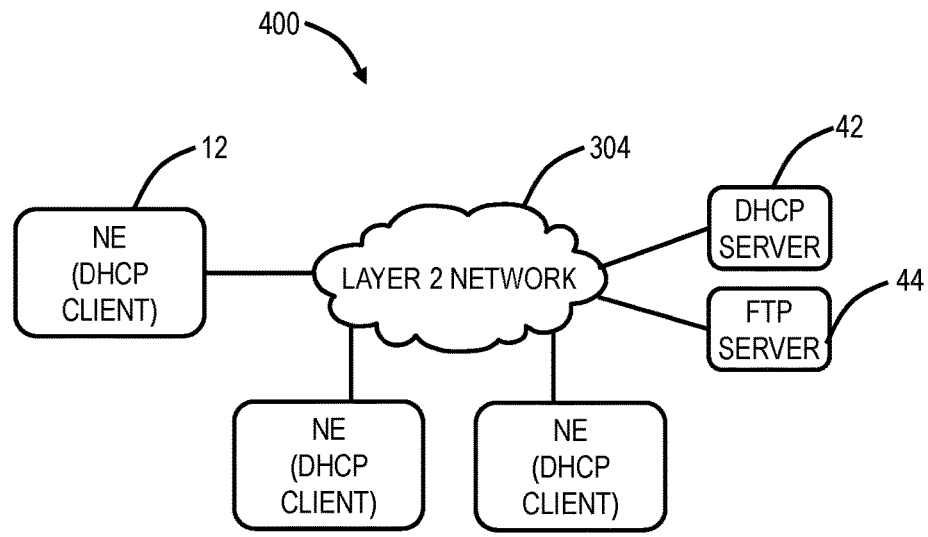
FIG. 15 is a network diagram of a network illustrating zero touch provisioning of network elements over a layer 2 network.
Figure 16:
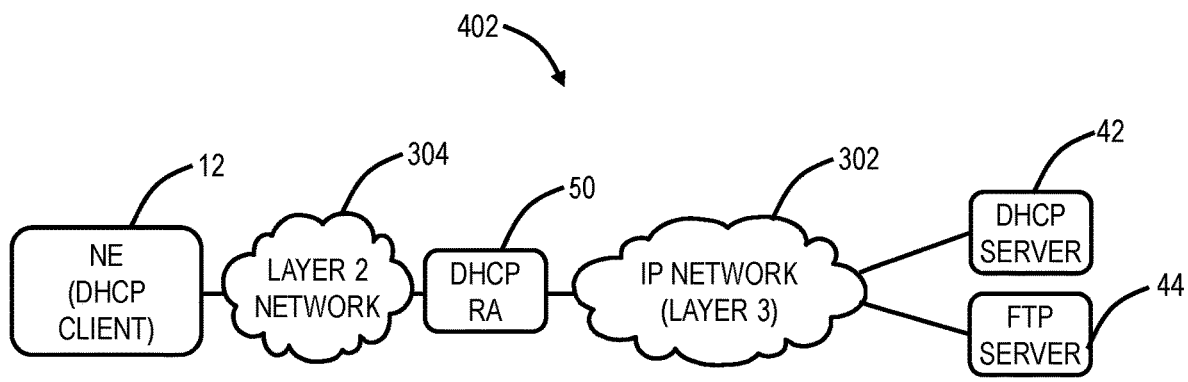
FIG. 16 is a network diagram of a network illustrating zero touch provisioning of network elements over a layer 3 network.
Figure 17:
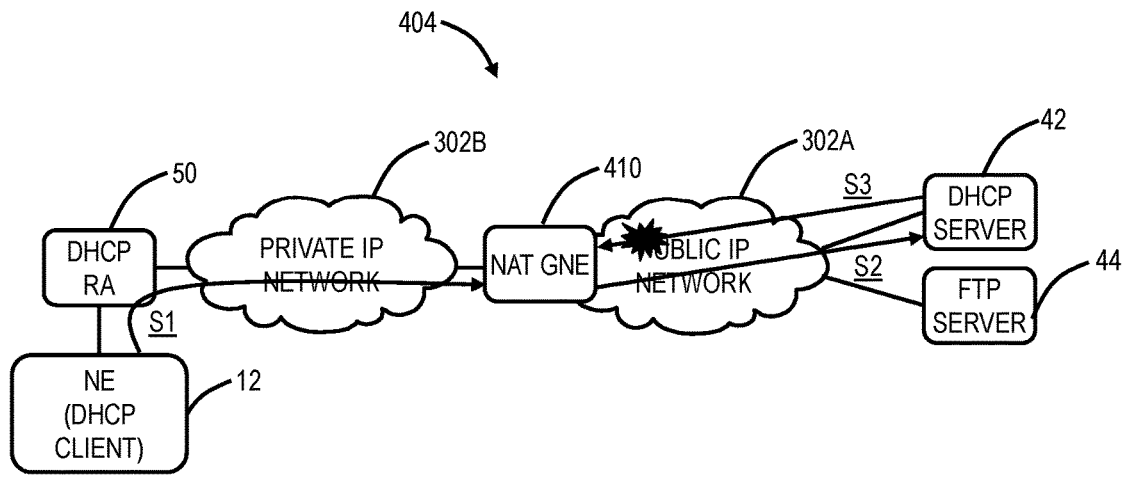
FIG. 17 is a network diagram of a network illustrating the problems in zero touch provisioning of network elements where a NAT gateway prevents a DHCP Relay Agent from communicating to the DHCP server.
Figure 18:
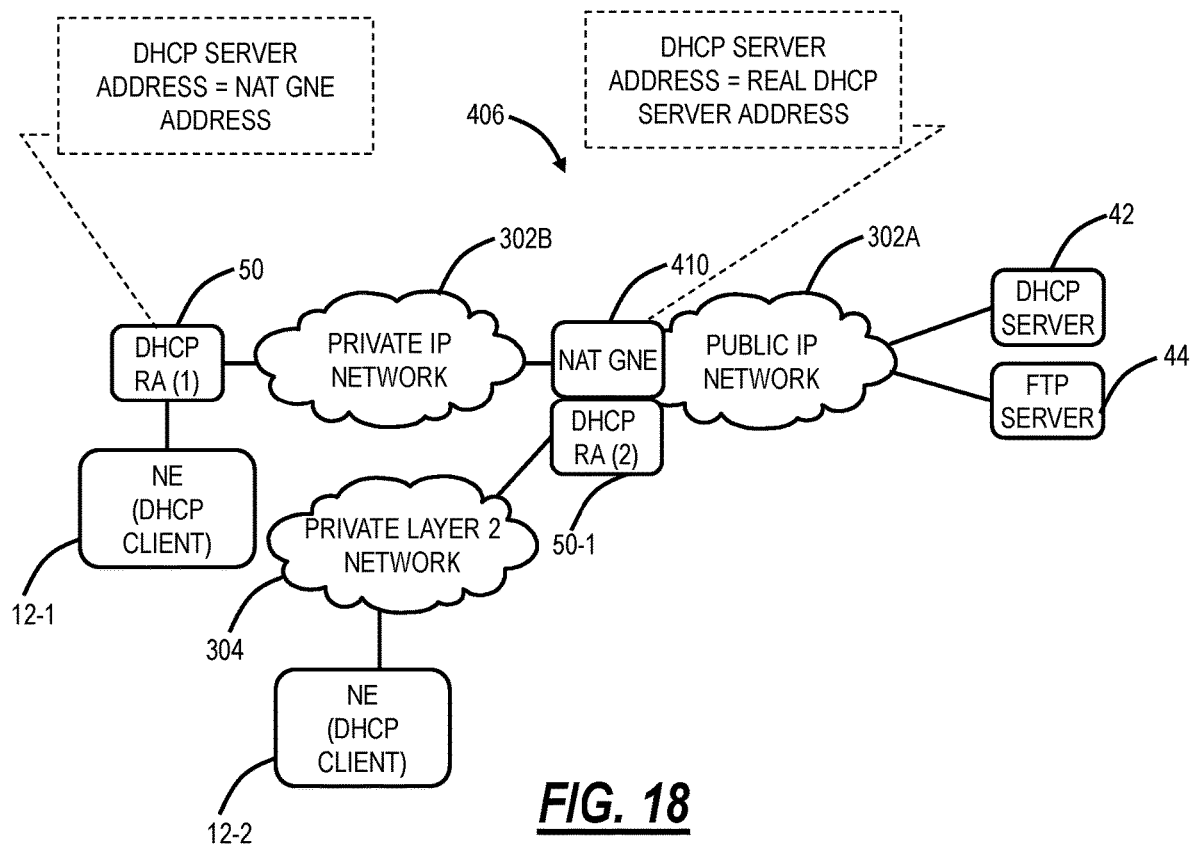
FIG. 18 is a network diagram of a network illustrating zero touch provisioning of the network elements through the NAT gateway.

FIG. 15 is a network diagram of a network 400 illustrating zero touch provisioning of network elements 12 over a layer 2 packet network 304. FIG. 16 is a network diagram of a network 402 illustrating zero touch provisioning of network elements 12 over a layer 3 network 302. FIG. 17 is a network diagram of a network 404 illustrating the problems in zero touch provisioning of network elements 12 where a NAT gateway 410 prevents a DHCP Relay Agent 50 from communicating to the DHCP server 42. FIG. 18 is a network diagram of a network 406 illustrating zero touch provisioning of the network elements 12-1, 12-2 through the NAT gateway 410.

In FIG. 15, the DHCP server 42, the FTP server 44, and the network elements 12 are all located on the same layer 2 packet network 304. In this case, the network elements 12 broadcast their DHCP BOOTREQUEST packets on the layer 2 packet network 304 and the DHCP server 42 replies to the network elements 12 by assigning a lease to them so that the network elements 12 are able to complete the ZTP process by communicating to the FTP server 44.

In FIG. 16, however, in many cases, the DHCP server 42 and the network elements 12 are not in the same layer 2 packet network 304. Therefore, the DHCP BOOTREQUEST packets are not able to reach the DHCP server 42. To resolve this issue, RFC2131 introduces the DHCP Relay Agent (RA) 50 as a mediator to exchange DHCP packets between the DHCP clients (network element 12) and the DHCP server 42. The IP address of the DHCP server 42 must be configured on the DHCP Relay Agent 50. In FIG. 16, the network elements 12 broadcast their DHCP BOOTREQUEST packets within the layer 2 packet network 304. In this case, the DHCP BOOTREQUEST packets can arrive at a neighbor network element 12-1 which is provisioned as a DHCP Relay Agent 50. The DHCP Relay Agent 50 then converts the received broadcast packets to unicast packets and sends them to the DHCP server 42 over the layer 3 network 302. When the DHCP server 42 receives the packets, it unicasts the DHCP BOOTREPLY packets back to the DHCP Relay Agent 50 and the packets are forwarded unicast to the network element 12.

In FIG. 17, Network address translation (NAT) is a process of remapping a private IP address space into a public IP address space by modifying IP and/or port information of the IP packets while they are in transit across a NAT Gateway Network Element (GNE) 410. For example, in FIG. 17, the network 404 includes a public IP network 302A and a private IP network 302B with the NAT gateway 410 in between. Specifically, when the NAT gateway 410 receives a UDP packet destined to a public IP address from the private IP address space, it modifies the source IP address of the packet to its own public IP address and the source UDP port to a newly assigned UDP port. The NAT gateway 410 then tracks the mapping between the new port and the combination of the private IP address and port for returning packets. The returning packets must use the source IP address (i.e., the NAT gateway 410 address) and source port (i.e., the new port) of the original packets as the destination IP address and destination port of the returning packets. When the NAT gateway 410 receives the packets, it attempts to match the destination port of the packet to a combination of the private IP address and UDP port. If a match is found, the NAT gateway 410 modifies the destination IP to the private IP address and the destination port to the tracked one corresponding to the original UDP packet and forwards the packet to that private network destination.

In FIG. 17, the NAT gateway 410 prevents the DHCP Relay Agent 50 from communicating to the DHCP server 42. The issue comes from the DHCP standard RFC2131. The standard requires DHCP clients to send BOOTREQUEST packets to the UDP port 67 of the DHCP servers 42. It also requires DHCP servers 42 to send BOOTREPLY packets to the UDP port 67 of the DHCP Relay Agents 50 or port 68 of the DHCP clients. RFC2131 also requires DHCP servers 42 to use the IP address of the DHCP Relay Agent 50 (in private IP address space) as the destination IP address of the returning packets instead of the source IP address of the receiving packets (in public IP address space). The above requirements create the problem that the returning packets cannot be routed to the DHCP Relay Agent 50 in the public IP networks because the destination IP address is in private IP space.

Details of this problem are as follows with reference to FIG. 17. At step S1, when the DHCP client at the network element 12 initiates DHCP negotiation, it broadcasts a DHCP BOOTREQUEST packet. When the packet arrives at the DHCP Relay Agent 50, the DHCP Relay Agent 50 sets its private IP address to the DHCP packet as NAT gateway 410 address and forwards it to the DHCP server 42.

At step S2, when the packet arrives at the NAT gateway 410, the source IP address of the packet is translated to the public address of the NAT gateway 410 and the source UDP port is translated to a newly assigned UDP port. The NAT gateway 410 then forwards the packet to the DHCP server 42. At step S3, when the DHCP server 42 receives the packet, it responds by sending a DHCP BOOTREPLY packet to the port 67 of the NAT gateway 410 address specified in the received DHCP packet. Since the NAT gateway 410 address is in the private IP address space, the BOOTREPLY packet cannot be routed to the NAT gateway 410, causing the DHCP negotiation to fail.

RFC3011 and RFC3527 define additional DHCP options so that the DHCP server 42 can send BOOTREPLY packets to an IP address different from the NAT gateway 410 address. By using these options, the DHCP Relay Agent 50 can instruct the DHCP server 42 to send the BOOTREPLY packets to the public IP address of the NAT gateway 410. With this arrangement, the DHCP BOOTREPLY packets can arrive at the NAT gateway 410. However, the NAT gateway 410 does not forward the packets to the DHCP Relay Agent 50 because the destination port is not the newly assigned UDP port but the port 67. Therefore, the NAT gateway 410 is not able to map the packets to a private network destination.

ZTP/LTP Through NAT Gateway

The systems and methods allow DHCP packets to be exchanged in the NAT gateway 410 network configuration, enabling ZTP in such configuration. In FIG. 18, the systems and methods include a network configuration with a special DHCP Relay Agent 50-1 configured at the NAT gateway 410 and techniques implemented in the special DHCP Relay Agent 50-1 on the NAT gateway 410. The DHCP Relay Agent 50-1 not only performs standard DHCP relay functions to serve any DHCP clients (e.g., the network element 12-2 that connect to it via the layer 2 packet network 304), but also serves other DHCP clients (e.g., the network element 12-1) via the DHCP Relay Agent 50.

Unlike the standard DHCP deployment where the DHCP server 42 address must be provisioned on the DHCP Relay Agent 50 to unicast the packets to the DHCP server 42, the systems and methods require the IP address of the NAT gateway 410 to be provisioned on the DHCP Relay Agent 50, i.e., the "DHCP server address" for the DHCP Relay Agent 50 is set to the NAT gateway address 410, not the DHCP server 42 address. The IP address of the DHCP server 42 must be provisioned on the DHCP Relay Agent 50-1. The DHCP Relay Agent 50-1 can serve multiple DHCP Relay Agents 50 as well as multiple layer 2 DHCP clients, such as the network element 12-2.

Specifically, the network configuration of the network 406 has all DHCP packets in the private IP network 302B and the layer 2 packet network 304 destined to the DHCP Relay Agent 50-1 on the NAT gateway 410, including the DHCP packets forwarded by the DHCP Relay Agent 50. When the DHCP Relay Agent 50-1 identifies that the DHCP packets come from the DHCP Relay Agent 50, it performs a technique of option 82 switching and relays the packets to the DHCP server 42. The DHCP server 42, without noticing the existence of the DHCP Relay Agent 50, sends the DHCP packets back to the DHCP Relay Agent 50-1 which performs the option 82 switching and forwards the packets to the DHCP Relay Agent 50. Therefore, the DHCP bidirectional communication is established between the DHCP Relay Agent 50 and the DHCP server 42. When the DHCP Relay Agent 50-1 identifies that the DHCP packets come from the DHCP clients (e.g., the network element 12-2) directly via the layer 2 packet network 304, it performs the standard DHCP relay functionality.

Option 82 Switching

Figure 19:
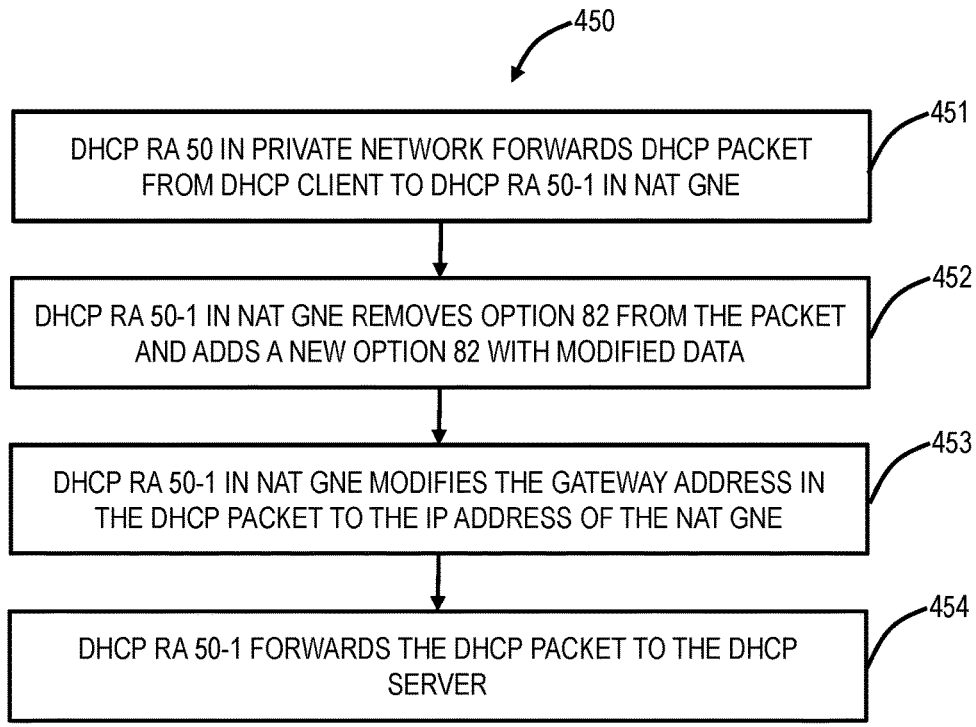
FIG. 19 is a flowchart of a process for sending a DHCP packet from a DHCP client in the network element to the DHCP server through the NAT gateway.
Figure 20:
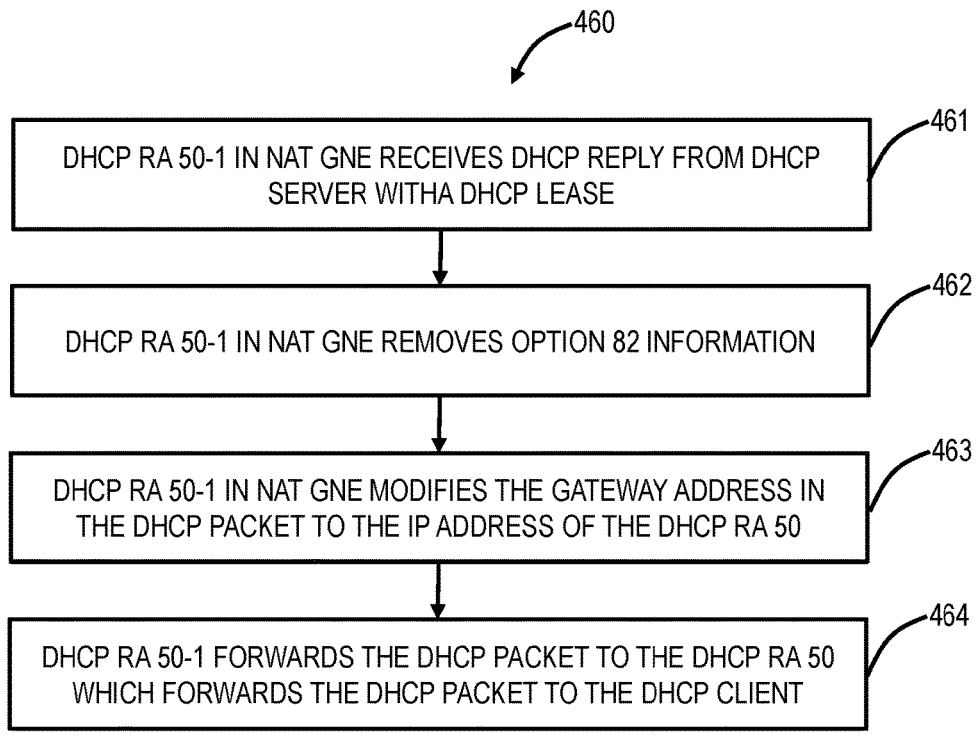
FIG. 20 is a flowchart of a process for sending a DHCP packet from the DHCP server to the DHCP client in the network element through the NAT gateway.

FIG. 19 is a flowchart of a process 450 for sending a DHCP packet from a DHCP client in the network element 12-1 to the DHCP server 42 through the NAT gateway 410. FIG. 20 is a flowchart of a process 460 for sending a DHCP packet from the DHCP server 42 to the DHCP client in the network element 12-1 through the NAT gateway 410. Specifically, the processes 450, 460 describe so-called option 82 switching, namely the DHCP Relay Agent 50-1 performs relay agent information option switching when the DHCP Relay Agent 50-1 receives DHCP packets from the DHCP Relay Agent 50 destined to the DHCP server 42 and vice versa.

In FIG. 19, the process 450 is implemented responsive to the DHCP client in the network element 12-1 sending a DHCP packet (e.g., DHCP BOOTREQUEST) to the DHCP Relay Agent 50 destined to the DHCP server 42. The DHCP Relay Agent 50 forwards the DHCP packet from the DHCP client in the network element 12-1 to the DHCP Relay Agent 50-1 (step 451). The DHCP Relay Agent 50-1 then removes the option 82 from the packet and adds a new option 82 that contains the sub-options of the original option 82 as well as a Link Selection Sub-option and a Vendor-Specific Information Sub-option (step 452). The Link Selection Sub-option contains the original gateway address which is the IP address of the DHCP Relay Agent 50. The gateway address is then modified to the public IP address of the NAT gateway 410 (step 453). As an option, a signature is generated and set to the Vendor-Specific Information Sub-option for authentication of the returning packets. After the option 82 switching, the DHCP Relay Agent 50-1 forwards the packet to the DHCP server 42 (step 454).

When the DHCP server 42 receives the DHCP BOOTREQUEST packet, it must assign a DHCP lease associated with an IP address pool. In terms of RFC3527, the DHCP server 42 first looks at the Link Selection Sub-option of the option 82 and uses that address to pick the IP address pool. Since that sub-option contains the IP address of the DHCP Relay Agent 50, the DHCP server 42 essentially uses that address to select the pool, which is expected by the DHCP Relay Agent 50. Then the DHCP server 42 sends a reply packet (e.g., BOOTREPLY) to the port 67 of the public IP address of the DHCP Relay Agent 50-1. By applying the option 82 switching technique on the DHCP Relay Agent 50-1, any standard DHCP server 42 is able to select correct leases for the DHCP clients and send them to the DHCP Relay Agent 50-1 successfully.

In FIG. 20, when the DHCP Relay Agent 50-1 on the NAT gateway 410 receives the DHCP BOOTREPLY packet from the DHCP server 42 (step 461), it removes the Link Selection Sub-option and Vendor-Specific Information Sub-option from the option 82 (step 462), restores the gateway address to the DHCP Relay Agent 50 (step 463), and forwards the packet to the DHCP Relay Agent 50 (step 464). Since the DHCP Relay Agent 50 performs standard DHCP relay functions, the packets are then forwarded to the DHCP clients. The DHCP packets travel successfully between the DHCP client in the network element 12-1 and the DHCP server 42 on the NAT GNE network configuration. Therefore, the ZTP can be realized on such network settings.

The following table illustrates the option 82 switching at the DHCP Relay Agent 50-1 for different packet directions between the DHCP Relay Agent 50 and the DHCP Relay Agent 50-1, between the DHCP Relay Agent 50-1 and the DHCP server 42, between the DHCP server 42 and the DHCP Relay Agent 50-1, and between the DHCP Relay Agent 50-1 and the DHCP Relay Agent 50. Of note, the DHCP Relay Agent 50-1 is a node in each of these transactions and is configured to perform option 82 switching where the data in option 82 is modified to enable exchange between the DHCP client in the network element 12-1 and the DHCP server 42. GIADDR stands for Gateway IP Address.

| Packet Direction | GIADDR | Link Selection Sub-option | Vendor-Specific Information Sub-option | Destination IP Address |
|---|---|---|---|---|
| DHCP RA 50 → DHCP RA 50-1 | Private IP address of DHCP RA 50 | X | X | DHCP RA 50-1 |
| DHCP RA 50-1 → DHCP Server 42 | NAT GNE Public IP Address | Private IP address of DHCP RA 50 | Signature | DHCP Server 42 |
| DHCP Server 42 → DHCP RA 50-1 | NAT GNE Public IP Address | Private IP address of DHCP RA 50 | Signature | GIADDR (NAT GNE Public IP Address) |
| DHCP RA 50-1 → DHCP RA 50 | Private IP address of DHCP RA 50 | X | X | GIADDR (Private IP address of DHCP RA 50) |

DHCP Relay Agent Process

Figure 21:
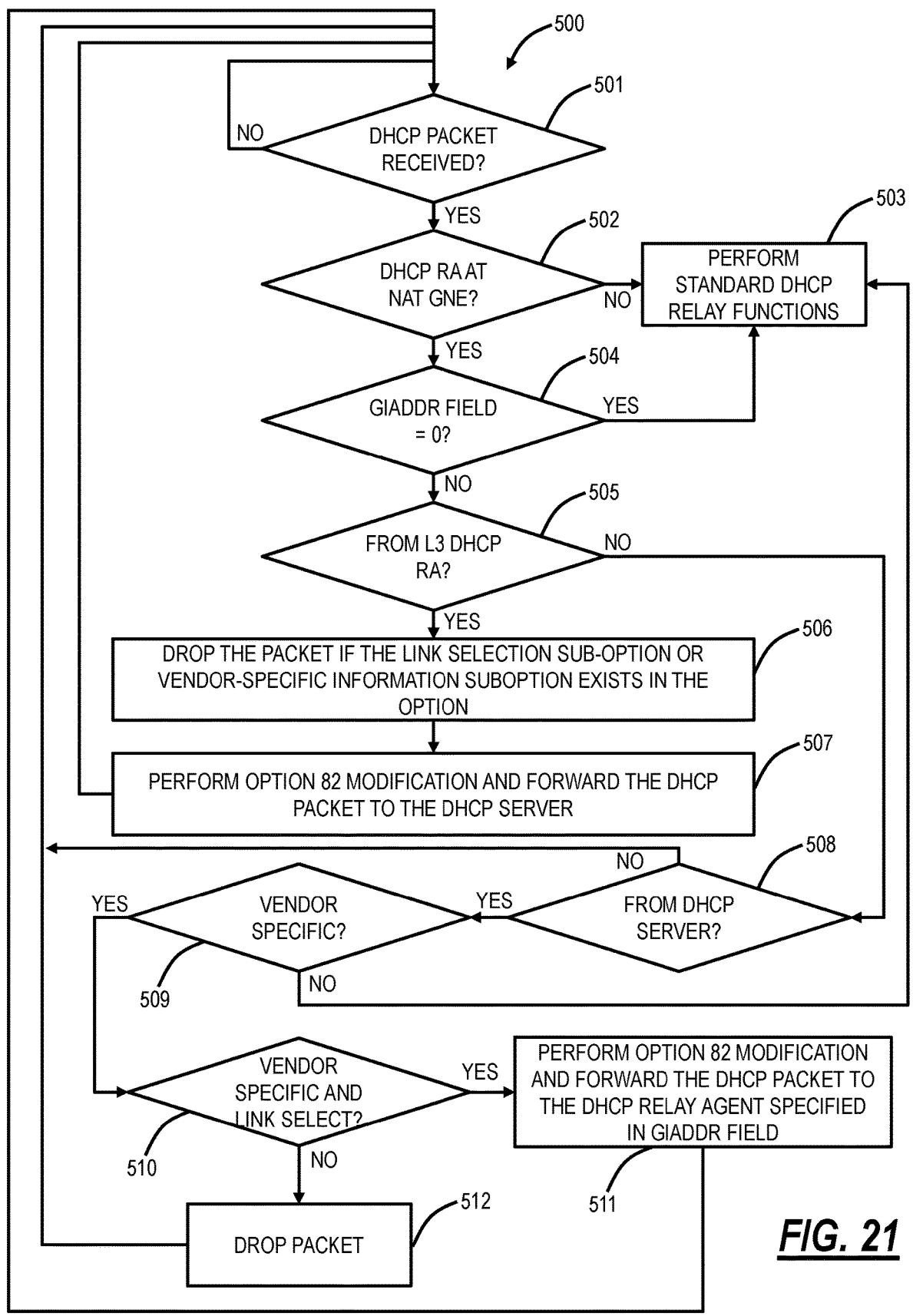
FIG. 21 is a flowchart of a process implemented by a DHCP Relay Agent.

FIG. 21 is a flowchart of a process 500 implemented by a DHCP Relay Agent (generic network element 12-1), such as the DHCP Relay Agent 50, DHCP Relay Agent 50-1. When DHCP packets are received on the DHCP Relay Agent (step 501), the process 500 includes, if the DHCP Relay Agent is not at a NAT GNE (step 502), performing standard DHCP relay functions such as defined in RFC2131 (step 503). If the DHCP Relay Agent is at the NAT GNE (step 502) and the GIADDR field is zero (step 504), the process 500 includes performing standard DHCP relay functions such as defined in RFC2131 (step 503).

If the GIADDR field is not zero (step 504) and the DHCP packet is from a Layer 3 DHCP Relay Agent (step 505), the process 500 includes dropping the packet if the Link Selection Sub-option or Vendor-Specific Information Sub-option exists in the option 82 (step 506) and performing option 82 modification and forwarding the DHCP packet to the DHCP server (step 507). The option 82 modification can include removing the existing option 82 data from the DHCP packet or if it does not exist, creating new option 82 data; adding the Link Selection Sub-option to the option 82 with the value of the sub-option as the value of the GIADDR field; adding the Vendor-Specific Information Sub-option to the option 82 with the value of the sub-option as a signature that is used to validate the returning packets from the DHCP server; setting the public IP address of the NAT GNE to the GIADDR field; and adding the option 82 data back to the DHCP packet.

If the DHCP packet is not from a Layer 3 DHCP Relay Agent (step 505) and from a DHCP server (step 508) and if Vendor-Specific Information Sub-option does not exist (step 509), standard DHCP relay functions are performed such as defined in the RFC2131 (step 503).

If both the Link Selection Sub-option exists and Vendor-Specific Information Sub-option exist (step 510), then option 82 modification is performed and the DHCP packet is forwarded to the DHCP Relay Agent specified in the GIADDR field (step 511). If both the Link Selection Sub-option and Vendor-Specific Information Sub-option do not exist (step 510), the DHCP packet is dropped (step 512). The option 82 modification in step 511 can include optionally validating the signature in the Vendor-Specific Information Sub-option to ensure the BOOTREPLY packet to be the one responding to the BOOTREQUEST packet initiated by the NAT GNE and to drop the packet if the validation fails; setting the value of the Link Selection Sub-option to the GIADDR field; and removing both sub-options from the option 82.

Process of LTP/ZTP Through a NAT Gateway

Figure 22:
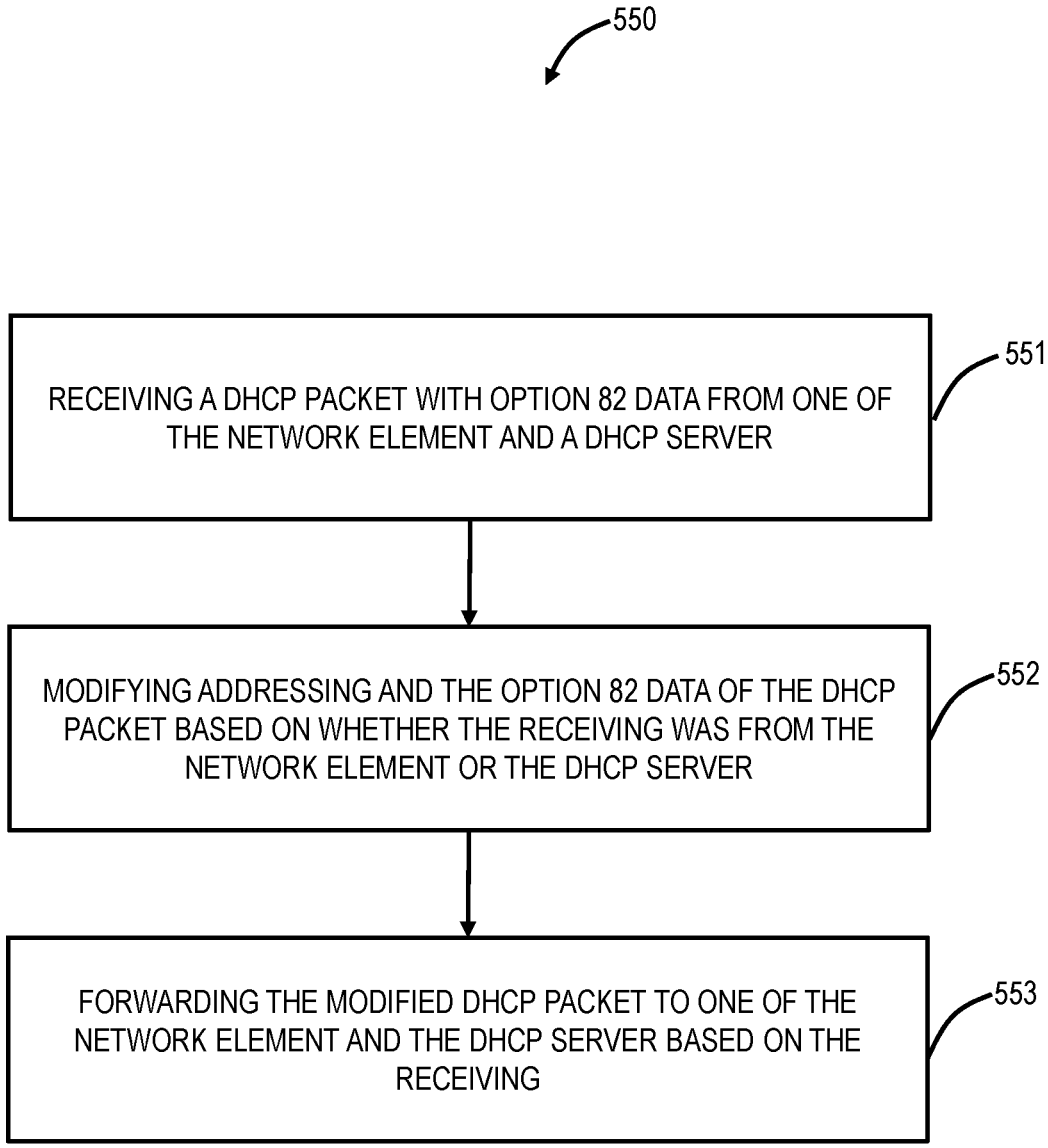
FIG. 22 is a flowchart of a process of low or zero touch provisioning of a network element through a Network Address Translation (NAT) gateway, implemented via a first Dynamic Host Configuration Protocol (DHCP) Relay Agent operating at the NAT gateway.

FIG. 22 is a flowchart of a process 550 of low or zero touch provisioning of a network element through a Network Address Translation (NAT) gateway, implemented via a first Dynamic Host Configuration Protocol (DHCP) Relay Agent operating at the NAT gateway. The process 550 includes receiving a DHCP packet with option 82 data from one of the network element and a DHCP server (step 551); modifying addressing and the option 82 data of the DHCP packet based on whether the receiving was from the network element or the DHCP server (step 552); and forwarding the modified DHCP packet to one of the network element and the DHCP server based on the receiving (step 553). The network element is configured to obtain an Internet Protocol (IP) address from the DHCP server and through the NAT gateway and communicate to a configuration server to download a configuration automatically subsequent to the configuration of the obtained IP address. The DHCP server can be in a different network address space from the network element.

The receiving from the network element and the forwarding to the network element are performed with a second DHCP Relay Agent between the network element and the first DHCP Relay Agent. The second DHCP Relay Agent can be configured to send the DHCP packet to a destination address of the first DHCP Relay Agent, and the modifying can include changing the destination address to an address of the DHCP server.

The receiving can be from the network element and the forwarding is to the DHCP server, and wherein the modifying can include changing a Gateway Internet Protocol (IP) Address (GIADDR) from an address of the second DHCP Relay Agent to an address of the NAT gateway; adding a Link Selection Sub-option as the address of the second DHCP Relay Agent; and changing a destination IP address from the first DHCP Relay Agent to the DHCP server. The receiving can be from the DHCP server and the forwarding can be to the network element via the second DHCP Relay Agent, and wherein the modifying can include changing a Gateway Internet Protocol (IP) Address (GIADDR) from an address of the NAT gateway to an address of the second DHCP Relay Agent; removing a Link Selection Sub-option as the address of the second DHCP Relay Agent; and changing a destination IP address from the NAT gateway to the second DHCP Relay Agent. The modifying the option 82 data can include adding a signature in a Vendor-Specific Information Sub-option for authentication of returning packets.

In another embodiment, a Dynamic Host Configuration Protocol (DHCP) Relay Agent operating on a Network Address Translation (NAT) gateway for low or zero touch provisioning of a network element through the NAT gateway includes a processor; and memory storing instructions that, when executed, cause the processor to receive a DHCP packet with option 82 data from one of the network element and a DHCP server; modify addressing and the option 82 data of the DHCP packet based on whether the DHCP packet was received from the network element or the DHCP server; and forward the modified DHCP packet to one of the network element and the DHCP server based on where it was received.

In a further embodiment, a network element configured for supporting low or zero touch provisioning through a Network Address Translation (NAT) gateway a plurality of modules interconnected to one another; and a Dynamic Host Configuration Protocol (DHCP) Relay Agent operating on one of the plurality of modules, wherein the DHCP Relay Agent is configured to communicate DHCP packets with option 82 data between a second DHCP Relay Agent configured on a NAT gateway; obtain an Internet Protocol (IP) address lease from a DHCP server through the second DHCP Relay Agent and the NAT gateway; and obtain configuration information from a configuration server subsequent to configuration of the IP address lease, wherein the network element is in a different address space from the DHCP server and the configuration server.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of low or zero touch provisioning of a network element through a Network Address Translation (NAT) gateway, implemented via a first Dynamic Host Configuration Protocol (DHCP) Relay Agent operating at the NAT gateway, the method comprising:
   receiving a DHCP packet with option 82 data from a DHCP server;
   modifying addressing and the option 82 data of the DHCP packet based on the receiving being from the DHCP server; and
   forwarding the modified DHCP packet to the network element via a second DHCP Relay Agent based on the receiving, wherein the second DHCP Relay Agent is between the network element and the first DHCP Relay Agent,
   wherein the modifying on the first DHCP Relay Agent comprises:
      changing a Gateway Internet Protocol (IP) Address (GIADDR) from an address of the NAT gateway to an address of the second DHCP Relay Agent;
      removing a Link Selection Sub-option as the address of the second DHCP Relay Agent; and
      changing a destination IP address from the NAT gateway to the second DHCP Relay Agent.

2. The method of claim 1, wherein the network element is configured to obtain an Internet Protocol (IP) address from the DHCP server and through the NAT gateway and communicate to a configuration server to download a configuration automatically subsequent to configuration of the obtained IP address.

3. The method of claim 1, wherein the DHCP server is in a different network address space from the network element.

4. The method of claim 1, wherein the second DHCP Relay Agent is configured to send a second DHCP packet to a destination address of the first DHCP Relay Agent, and further comprising modifying addressing of the second DHCP packet by changing the destination address to an address of the DHCP server.

5. The method of claim 1, wherein the option 82 data includes a signature in a Vendor-Specific Information Sub-option for authentication of the DHCP packet.

6. A Dynamic Host Configuration Protocol (DHCP) Relay Agent operating on a Network Address Translation (NAT) gateway for low or zero touch provisioning of a network element through the NAT gateway, the DHCP Relay Agent comprising:

a processor; and memory storing instructions that, when executed, cause the processor to receive a DHCP packet with option 82 data from a DHCP server;

modify addressing and the option 82 data of the DHCP packet based on the DHCP packet being received from the DHCP server; and forward the modified DHCP packet to the network element via a second DHCP Relay Agent based on where it was received, wherein the second DHCP Relay Agent is between the network element and the DHCP Relay Agent, wherein the modifying on the first DHCP Relay Agent comprises:

changing a Gateway Internet Protocol (IP) Address (GIADDR) from an address of the NAT gateway to an address of the second DHCP Relay Agent;

removing a Link Selection Sub-option as the address of the second DHCP Relay Agent; and changing a destination IP address from the NAT gateway to the second DHCP Relay Agent.

7. The DHCP Relay Agent of claim 6, wherein the network element is configured to obtain an Internet Protocol (IP) address from the DHCP server and through the NAT gateway and communicate to a configuration server to download a configuration automatically subsequent to configuration of the obtained IP address.

8. The DHCP Relay Agent of claim 6, wherein the DHCP server is in a different network address space from the network element.

9. The DHCP Relay Agent of claim 6, wherein the second DHCP Relay Agent is configured to send a second DHCP packet to a destination address of the DHCP Relay Agent, and the instructions that, when executed, further cause the processor to change the destination address of the second DHCP packet to an address of the DHCP server.

10. The DHCP Relay Agent of claim 6, wherein the option 82 data comprises a signature added in a Vendor-Specific Information Sub-option for authentication of the DHCP packet.

11. A non-transitory computer-readable medium comprising instructions for low or zero touch provisioning of a network element through a Network Address Translation (NAT) gateway, wherein the instructions are executed by a processor associated with a first Dynamic Host Configuration Protocol (DHCP) Relay Agent operating at the NAT gateway, the instructions are operable to cause the processor to perform the steps of:

receiving a DHCP packet with option 82 data from a DHCP server;

modifying addressing and the option 82 data of the DHCP packet based on the receiving being from the DHCP server; and forwarding the modified DHCP packet to the network element via the second DHCP Relay Agent based on the receiving, wherein the second DHCP Relay Agent is between the network element and the first DHCP Relay Agent, wherein the modifying on the first DHCP Relay Agent comprises:

changing a Gateway Internet Protocol (IP) Address (GIADDR) from an address of the NAT gateway to an address of the second DHCP Relay Agent;

removing a Link Selection Sub-option as the address of the second DHCP Relay Agent; and changing a destination IP address from the NAT gateway to the second DHCP Relay Agent.

12. The non-transitory computer-readable medium of claim 11, wherein the network element is configured to obtain an Internet Protocol (IP) address from the DHCP server and through the NAT gateway and communicate to a configuration server to download a configuration automatically subsequent to configuration of the obtained IP address.

13. The non-transitory computer-readable medium of claim 11, wherein the DHCP server is in a different network address space from the network element.

* * * * *